(12) United States Patent
Akabane et al.

(10) Patent No.: US 9,933,579 B2
(45) Date of Patent: Apr. 3, 2018

(54) OPTICAL MODULE AND METHOD OF MANUFACTURING OPTICAL MODULE

(71) Applicant: FUJITSU COMPONENT LIMITED, Tokyo (JP)

(72) Inventors: Ayumu Akabane, Tokyo (JP); Takeshi Komiyama, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/606,258

(22) Filed: May 26, 2017

(65) Prior Publication Data

US 2018/0031772 A1 Feb. 1, 2018

(30) Foreign Application Priority Data

Jul. 28, 2016 (JP) .................................. 2016-148690

(51) Int. Cl.
*G02B 6/36* (2006.01)
*G02B 6/42* (2006.01)

(52) U.S. Cl.
CPC ......... *G02B 6/3652* (2013.01); *G02B 6/4204* (2013.01); *G02B 6/4236* (2013.01); *G02B 6/3636* (2013.01)

(58) Field of Classification Search
CPC .................................................. G02B 6/4239
See application file for complete search history.

(56) References Cited

U.S. PATENT DOCUMENTS

| | | | |
|---|---|---|---|
| 7,781,236 B2 | 8/2010 | Suzuki et al. | |
| 9,316,799 B2 | 4/2016 | Shiraishi | |
| 2008/0247704 A1* | 10/2008 | Kodama | G02B 6/4204 385/14 |
| 2015/0212285 A1* | 7/2015 | Kainuma | G01J 1/0407 250/214 A |

FOREIGN PATENT DOCUMENTS

| | | |
|---|---|---|
| JP | 2009-069360 | 4/2009 |
| JP | 2014-102399 | 6/2014 |

* cited by examiner

*Primary Examiner* — Omar R Rojas
(74) *Attorney, Agent, or Firm* — IPUSA, PLLC

(57) ABSTRACT

An optical module includes an optical waveguide; a lens sheet including a lens; a substrate on one surface of which at least one of a light emitting element and a light receiving element is mounted; a first adhesion film that adheres the optical waveguide and the lens sheet; a second adhesion film that adheres the lens sheet and the substrate; and an adhesive agent introducing area, provided at at least one of the first adhesion film and the second adhesion film, to which an adhesive agent is supplied.

7 Claims, 34 Drawing Sheets

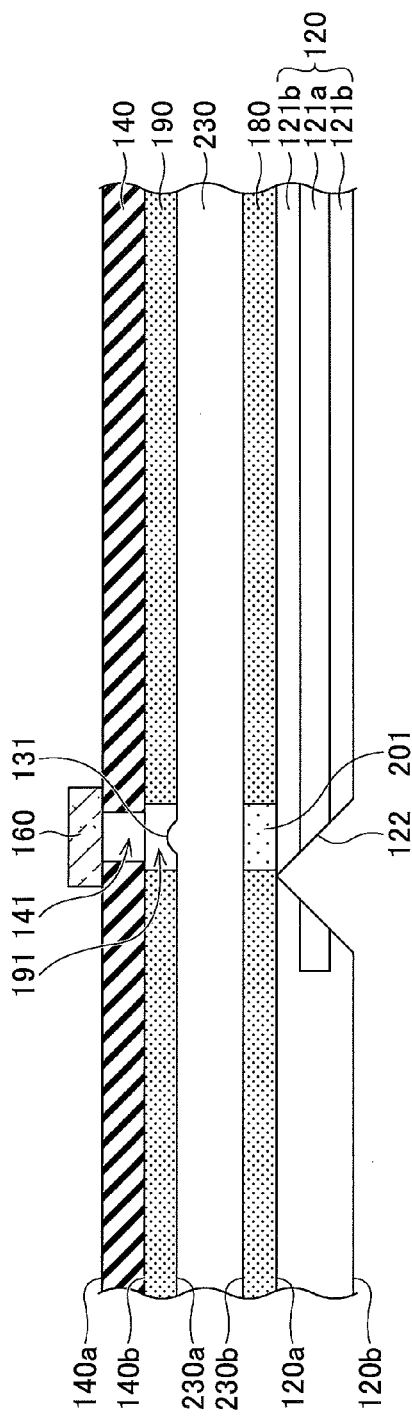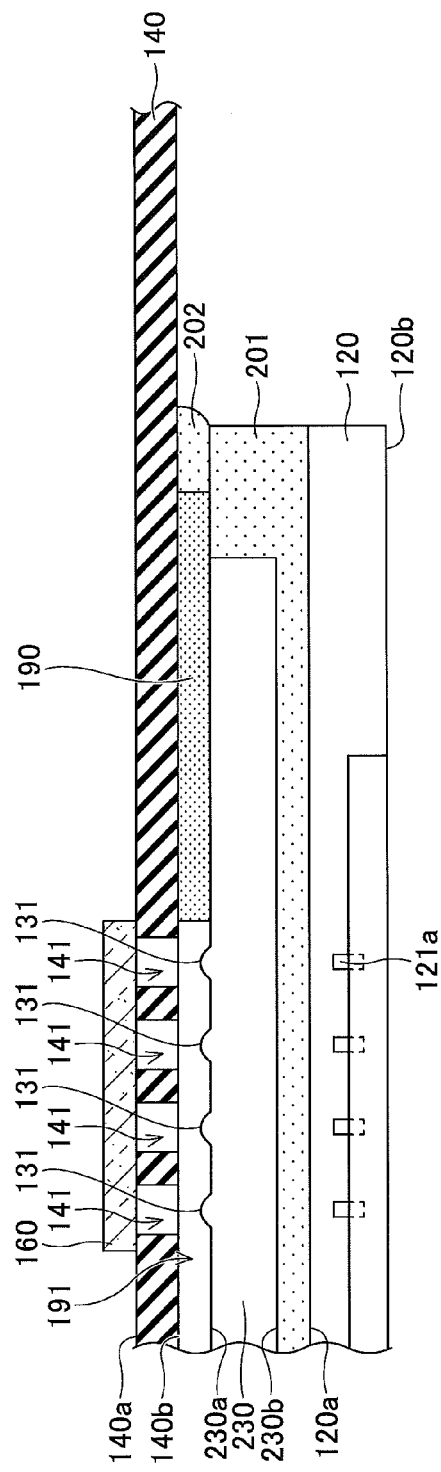

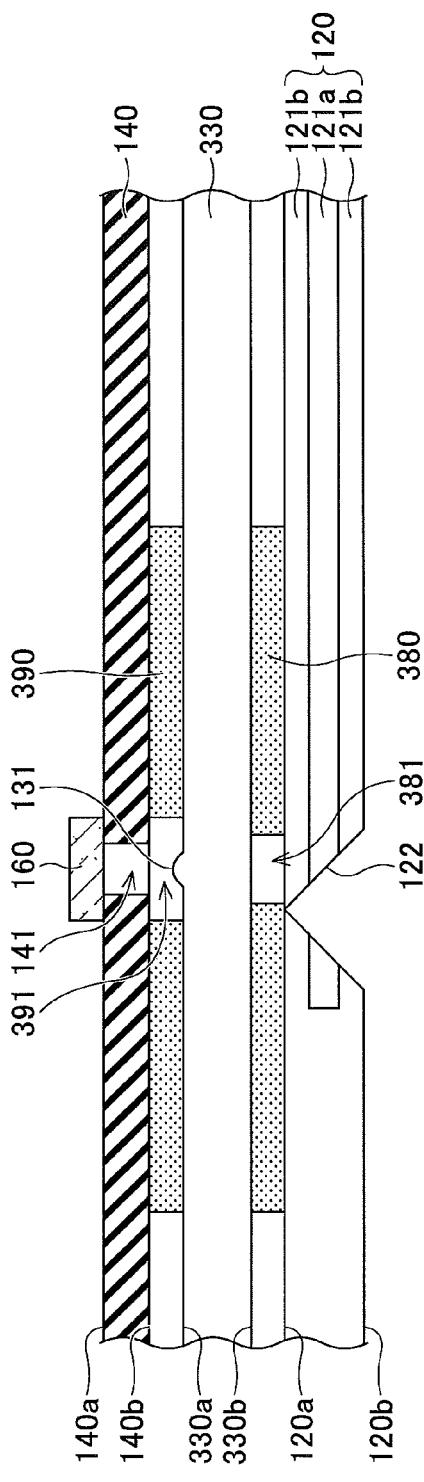
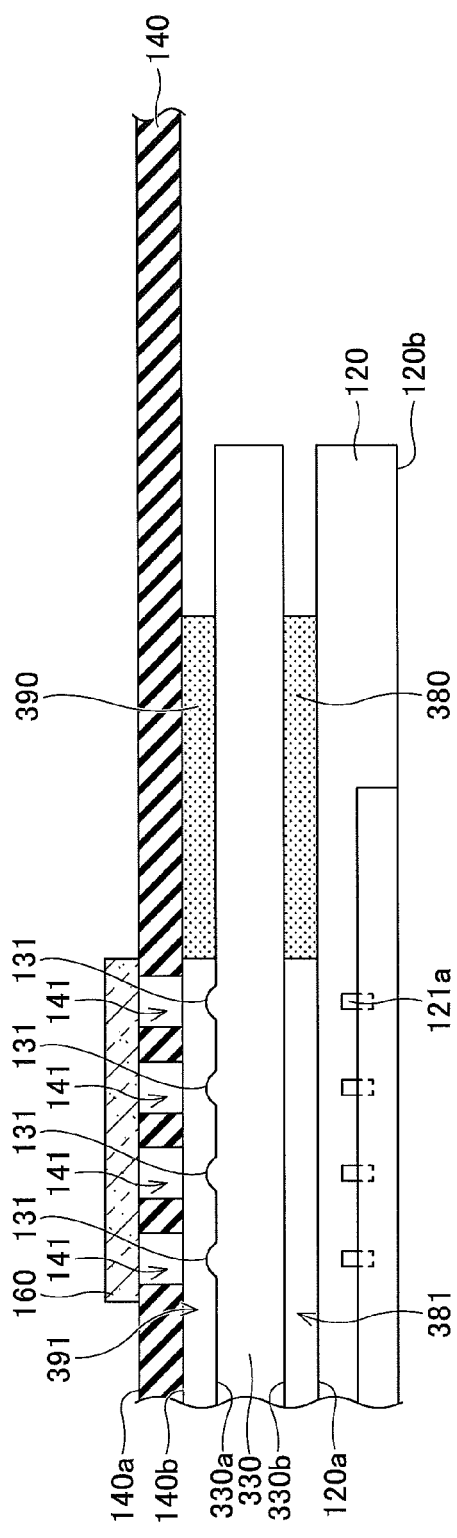
FIG.20A
FIG.20B

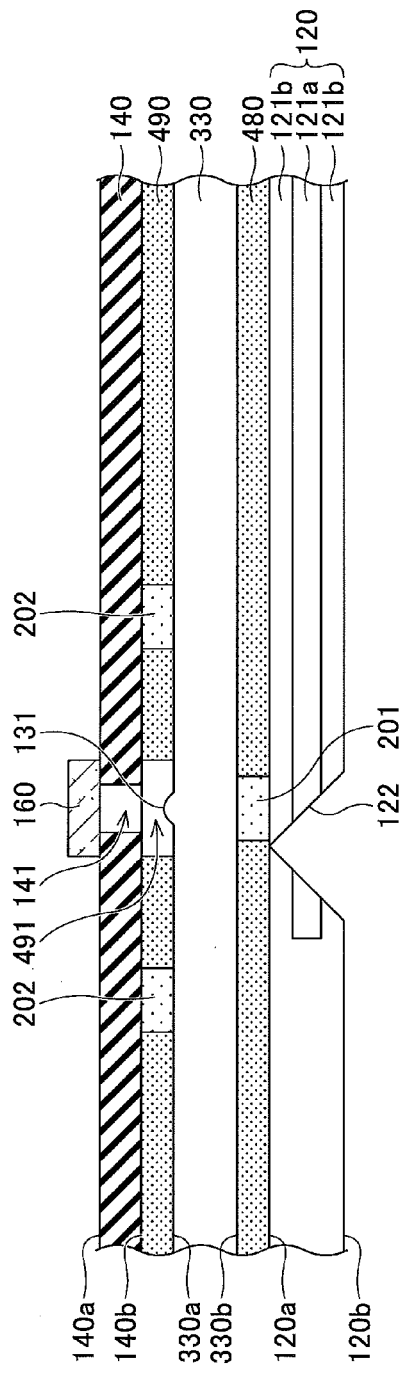
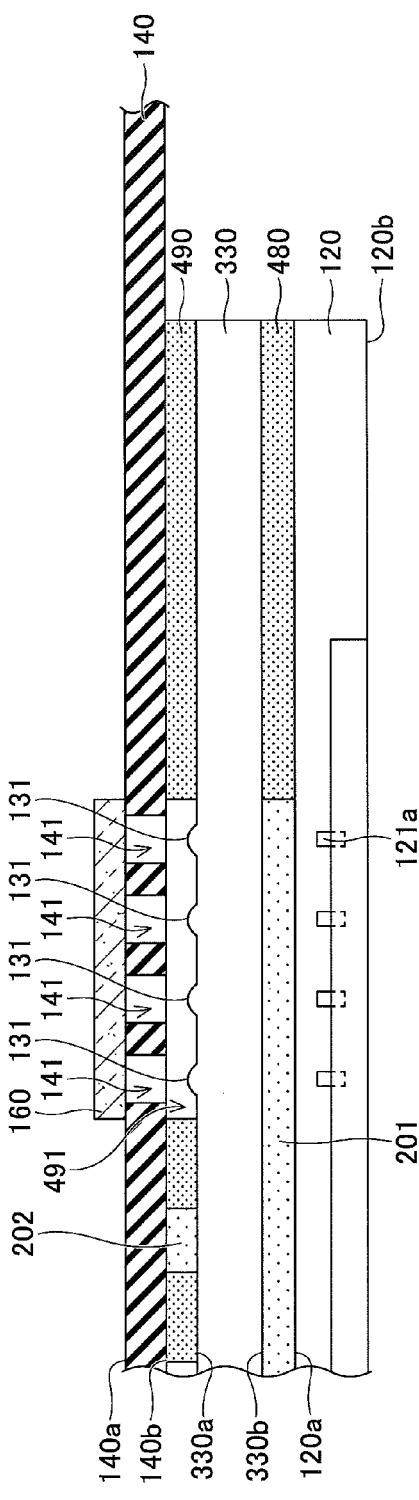
FIG.26A
FIG.26B

OPTICAL MODULE AND METHOD OF MANUFACTURING OPTICAL MODULE

CROSS-REFERENCE TO RELATED APPLICATION

The present application is based on and claims the benefit of priority of Japanese Priority Application No. 2016-148690 filed on Jul. 28, 2016, the entire contents of which are hereby incorporated by reference.

BACKGROUND OF THE INVENTION

1. Field of the Invention

The present invention relates to an optical module and a method of manufacturing an optical module.

2. Description of the Related Art

QSFP (Quad Small Form-factor Pluggable) is known as a communication interface standard of optical communication, and a QSFP optical module is used. The QSFP optical module includes an optical waveguide module in which a light emitting element and a light receiving element are mounted on an optical waveguide. The optical waveguide module is manufactured by adhering the light emitting element and the light receiving element to the optical waveguide by an adhesion sheet after aligning the parts such that light from the light emitting element is injected into the optical waveguide, and light from the optical waveguide is injected into the light receiving element.

However, there is a case that the light emitting element or the light receiving element is shifted with respect to the optical waveguide when a cable connected to the QSFP optical module is pulled. If the light emitting element or the light receiving element is shifted with respect to the optical waveguide, optical loss becomes large. Then, functions of the optical waveguide module are lowered because light transmitted through the optical waveguide is not injected into the light receiving element, or light emitted from the light emitting element is not injected into the optical waveguide.

Thus, an optical waveguide module in which a light emitting element or a light receiving element is mounted on an optical waveguide, and in which positional displacement of the light receiving element or the light emitting element with respect to the optical waveguide does not occur is required.

PATENT DOCUMENTS

[Patent Document 1] Japanese Laid-open Patent Publication No. 2009-69360

[Patent Document 2] Japanese Laid-open Patent Publication No. 2014-102399

SUMMARY OF THE INVENTION

According to an embodiment, there is provided an optical module including an optical waveguide; a lens sheet including a lens; a substrate on one surface of which at least one of a light emitting element and a light receiving element is mounted; a first adhesion film that adheres the optical waveguide and the lens sheet; second adhesion film that adheres the lens sheet and the substrate; and an adhesive agent introducing area, provided at at least one of the first adhesion film and the second adhesion film, to which an adhesive agent is supplied.

BRIEF DESCRIPTION OF THE DRAWINGS

Other objects, features and advantages of the present invention will become more apparent from the following detailed description when read in conjunction with the accompanying drawings.

FIG. 15A and FIG. 15B are cross-sectional views of the optical waveguide module of the second embodiment;

FIG. 20A and FIG. 20B are cross-sectional views of the optical waveguide module of the third embodiment;

FIG. 26A and FIG. 26B are cross-sectional views of the optical waveguide module of the fourth embodiment;

DETAILED DESCRIPTION OF THE PREFERRED EMBODIMENTS

Figure 1:
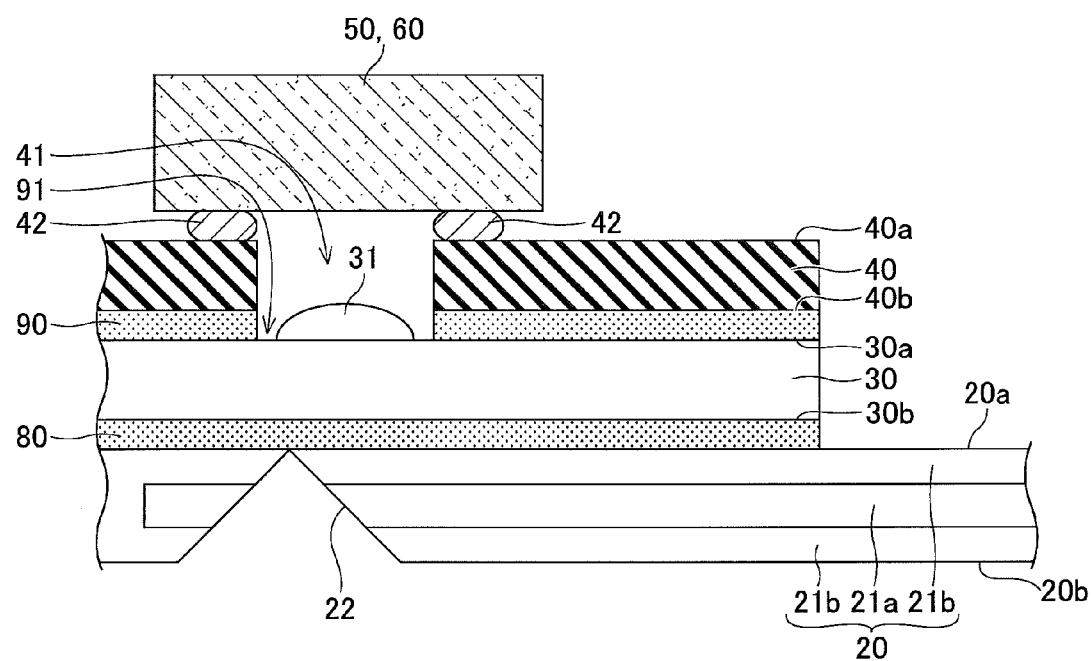
FIG. 1 is a cross-sectional view of an optical waveguide module.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

First, an example of positional displacement of a light emitting element and a light receiving element with respect to an optical waveguide in an optical waveguide module is described.

Figure 2:
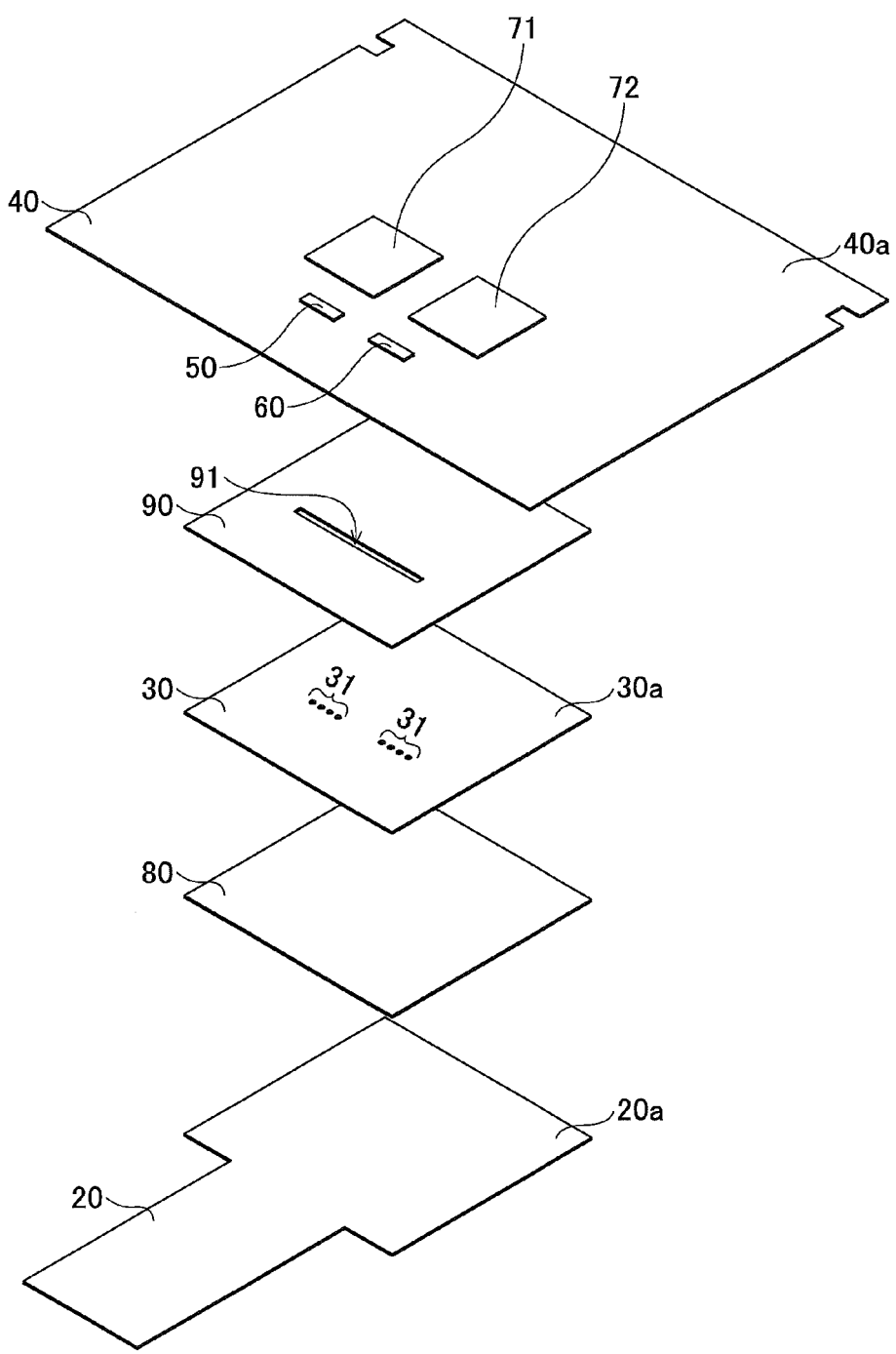
FIG. 2 is an exploded perspective view of the optical waveguide module.

FIG. 1 is a cross-sectional view of an optical waveguide module, and FIG. 2 is an exploded perspective view of the optical waveguide module. In the optical waveguide module illustrated in FIG. 1 and FIG. 2, a lens sheet 30 and a flexible substrate (hereinafter, simply referred to as a "substrate") 40 are stacked on an optical waveguide 20 in a sheet form.

The optical waveguide 20 includes cores 21a and clads 21b sandwiching the cores 21a to cover the cores 21a. A ferrule with a lens (not illustrated in the drawings) is connected to one end portion of the optical waveguide 20 (right end in FIG. 1). A plurality of lenses 31 are formed at a surface 30a of the lens sheet 30. A surface 20a of the optical waveguide 20 and a surface 30b of the lens sheet 30 are adhered by an adhesion sheet 80. A mirror 22 is formed at another end of the optical waveguide 20 by removing a part of the optical waveguide 20 from a surface 20b in a V-shape.

Wirings are formed in the substrate 40, and a light emitting element 50, a light receiving element 60, a driver 71 and a TIA (Transimpedance Amplifier) 72 are mounted on one surface 40a of the substrate 40. The light emitting element 50 includes a plurality of light emitting portions, and is a VCSEL (Vertical Cavity Surface Emitting LASER), for example. The light receiving element 60 includes a plurality of light receiving portions, and is a photodiode, for example. The driver 71 is an IC (Integrated Circuit) for driving the light emitting element 50, for example. The TIA 72 is an IC for converting current generated by light detected by the light receiving element 60 to voltage.

The substrate 40 is provided with through-holes 41 at optical paths of light emitted from the light emitting element 50 and light injected into the light receiving element 60. A surface 40b of the substrate 40 is adhered to the surface 30a of the lens sheet 30 by an adhesion sheet 90. The adhesion sheet 90 is provided with a through-hole 91 at the optical paths. The light emitting element 50, the light receiving element 60, the driver 71 and the TIA 72 are mounted on the substrate 40 through bumps 42. The adhesion sheets 80 and 90 are, for example, transparent double sided tapes. In this embodiment, a thickness of the optical waveguide 20 is about 105 µm, a thickness of the lens sheet 30 is about 75 µm, a thickness of the substrate 40 is about 65 µm, a thickness of each of the light emitting element 50 and the light receiving element 60 is about 200 µm, and a thickness of each of the adhesion sheets 80 and 90 is about 25 µm, for example.

In the optical waveguide module, the substrate 40, the lens sheet 30 and the optical waveguide 20 are adhered under a state that the light emitting portions of the light emitting element 50 and the light receiving portions of the light receiving element 60, the through-holes 41 of the substrate 40, the lenses 31 of the lens sheet 30, and the mirror 22 formed in the optical waveguide 20 are aligned. Light emitted from the light emitting element 50 pass through the through-holes 41 and the lenses 31, are reflected by the mirror 22, and are transmitted in the cores 21a, respectively. Further, the light transmitted in the cores 21a are reflected by the mirror 22, pass through the lenses 31 and the through-holes 41, and are injected into the light receiving element 60, respectively.

In the optical waveguide module, the substrate 40 is connected and fixed to a FPC (Flexible printed circuits) connector provided in a substrate in a QSFP optical module. However, an end portion of the optical waveguide 20 is not fixed. Thus, when force is applied to the optical waveguide 20 by deflection or the like of the optical waveguide 20, if the lens sheet 30 or the substrate 40 is not sufficiently fixed, the lens sheet 30 adhered by the adhesion sheet 80 may move with respect to a surface of the optical waveguide 20, or the substrate 40 adhered by the adhesion sheet 90 may move with respect to a surface of the lens sheet 30, and positional displacement of the parts may occur.

Figure 3A:
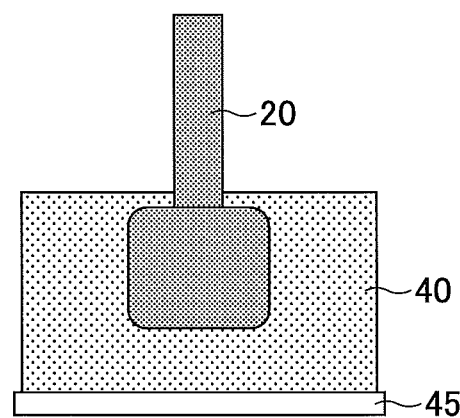
FIG. 3A and FIG. 3B are views for describing positional displacement in the optical waveguide module.
Figure 3B:
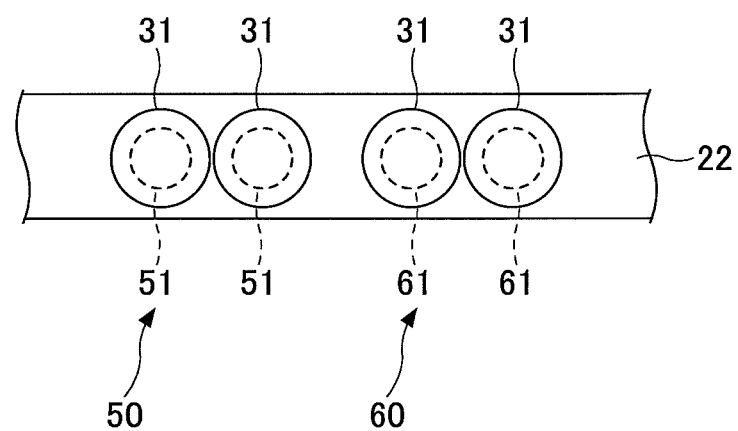

FIG. 3A and FIG. 3B illustrate a state in which the parts of the optical waveguide module are in a right positional relationship. FIG. 3A is a top view, and FIG. 3B partially illustrates the mirror 22, the lenses 31, the light emitting element 50 and the light receiving element 60. Under the state of FIG. 3A and FIG. 3B, a center of each of the mirror 22, the lenses 31, the light emitting element 50 and the light receiving element 60 is aligned (matched).

Figure 4A:
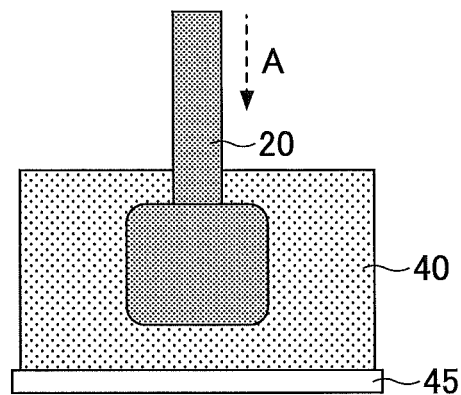
FIG. 4A and FIG. 4B are views for describing positional displacement in the optical waveguide module.
Figure 4B:
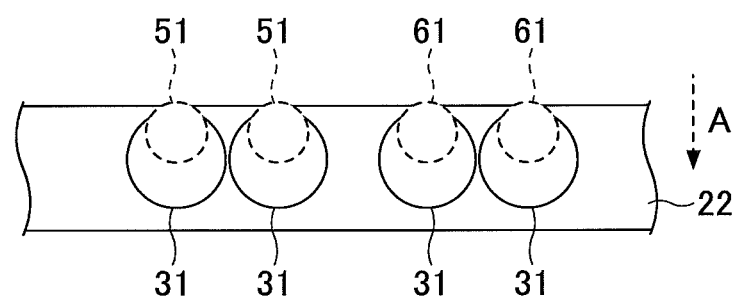

FIG. 4A and FIG. 4B illustrate the optical waveguide module under a state in which the optical waveguide 20 is pushed toward an FPC connector 45. When the optical waveguide 20 is flexibly included in the optical waveguide module, force is applied to the optical waveguide 20 in a direction of a broken line arrow A by restoring force generated in the optical waveguide 20. At this time, if the optical waveguide 20, the lens sheet 30 and the substrate 40 are not sufficiently fixed with each other, positional displacement of the parts occurs. For example, when the optical waveguide 20 is moved in a direction of the arrow A with respect to the lens sheet 30, as illustrated in FIG. 4B, the mirror 22 is shifted with respect to the lenses 31 in the direction of the arrow A. Similarly, when the lens sheet 30 is moved with respect to the substrate 40 in the direction of the arrow A, as illustrated in FIG. 4B, the lenses 31 are shifted with respect to light emitting portions 51 and light receiving portions 61 in the direction of the arrow A. In such a case, optical loss may occur in the optical waveguide module, and functions of the optical waveguide module may be lowered or the optical waveguide module may not function at all.

Figure 5A:
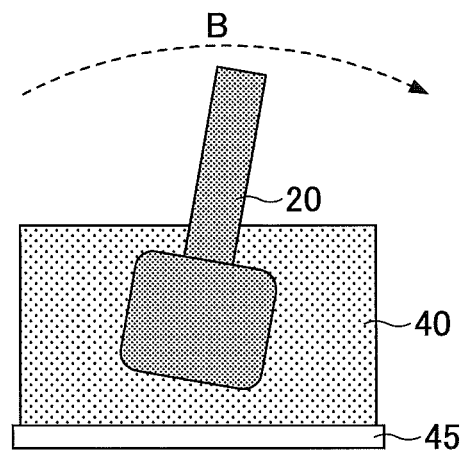
FIG. 5A and FIG. 5B are views for describing positional displacement in the optical waveguide module.
Figure 5B:
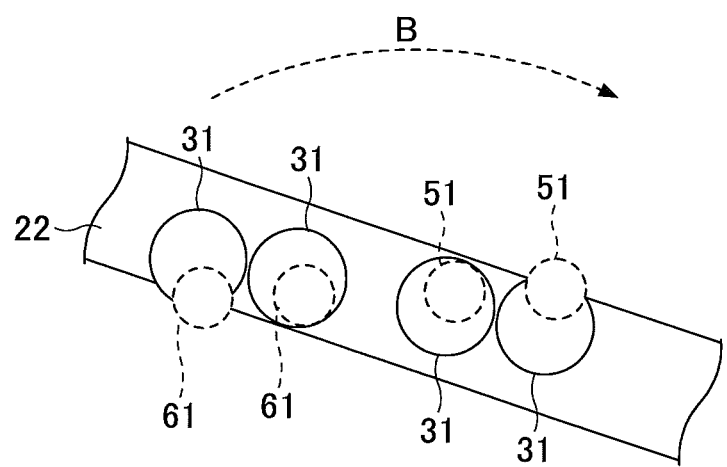

FIG. 5A and FIG. 5B illustrate a state in which the optical waveguide 20 is rotated with respect to the substrate 40 or the like. As illustrated in FIG. 5A, when force is applied to the optical waveguide 20 in a direction of a broken line arrow B, if the optical waveguide 20 and the lens sheet 30 are not sufficiently fixed, the optical waveguide 20 is rotated with respect to the lens sheet 30. As a result, as illustrated in FIG. 5B, the mirror 22 is displaced with respect to the lenses 31. Similarly, if the lens sheet 30 and the substrate 40 are not sufficiently fixed, the lenses 31 are rotated with respect to the light emitting portions 51 and the light receiving portions 61 in the direction of the arrow B. Thus, in this case as well, optical loss may be generated in the optical waveguide module.

As described above, the reason that the mirror 22, the lenses 31, the light emitting portions 51 and the light receiving portions 61 are shifted is that adhesion of each of the adhesion sheets 80 and 90, in other words, each of fixing force between the optical waveguide 20 and the lens sheet 30, and fixing force between the lens sheet 30 and the substrate 40 is weak.

If the optical waveguide 20 and the lens sheet 30, and the lens sheet 30 and the substrate 40 can be strongly fixed, such problems can be solved. In order to strongly fix the parts, for example, an adhesive agent may be used. If the adhesive agent is sufficiently cured, fixing force of the adhesive agent becomes higher than fixing force of the adhesion sheet.

However, it is difficult to control a coating amount of the adhesive agent, and further, viscosity of the adhesive agent may change. Thus, as it is difficult to control a thickness of the adhesive agent, a space between the optical waveguide 20 and the lens sheet 30 in a thickness direction, or a space between the lens sheet 30 and the substrate 40 in a thickness direction may be shifted from a desired space. In such a case, spaces between the mirror 22, the lenses 31, the light emitting portions 51/light receiving portions 61 may be shifted, and optical loss may occur.

Further, there is a risk that differences in contraction of parts (in particular, resin) of the optical waveguide module cannot be absorbed when the adhesive agent is cured. As a result, reliability of the optical waveguide module may not be sufficiently ensured.

On the other hand, if an adhesion sheet having an appropriate thickness is used, a distance between the lens sheet 30 and the substrate 40, and a distance between the lens sheet 30 and the optical waveguide 20 can be ensured with an allowable accuracy. Further, the differences in contraction of the parts can be absorbed if the adhesion sheet is used.

First Embodiment (Optical Waveguide Module)

Next, an optical waveguide module of a first embodiment is described with reference to FIG. 6 to FIG. 9B.

Figure 6:
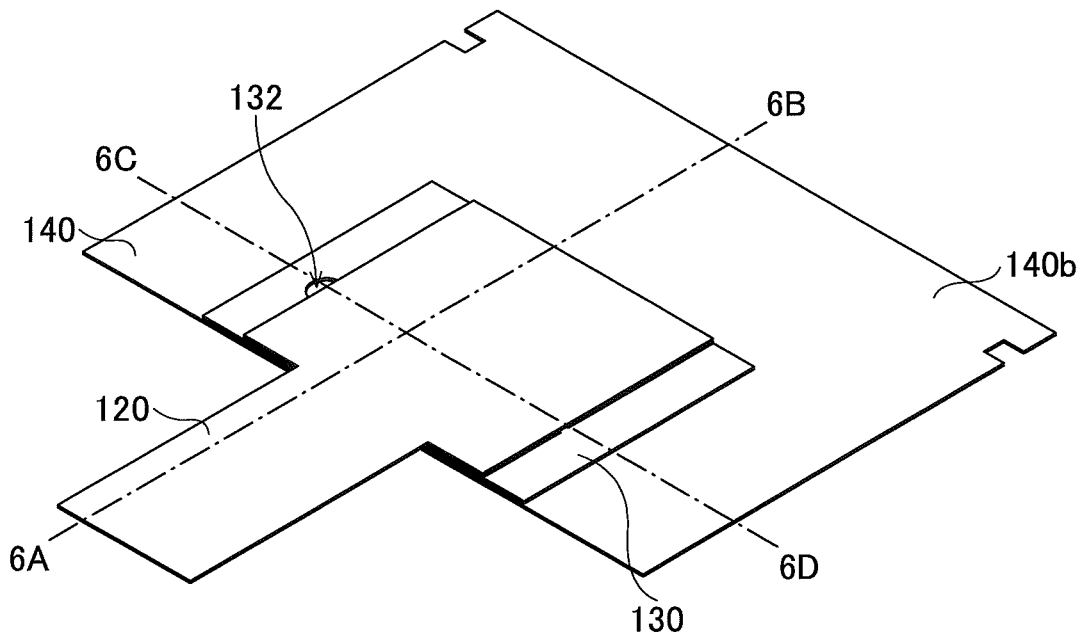
FIG. 6 is a perspective view of an optical waveguide module of a first embodiment.
Figure 7:
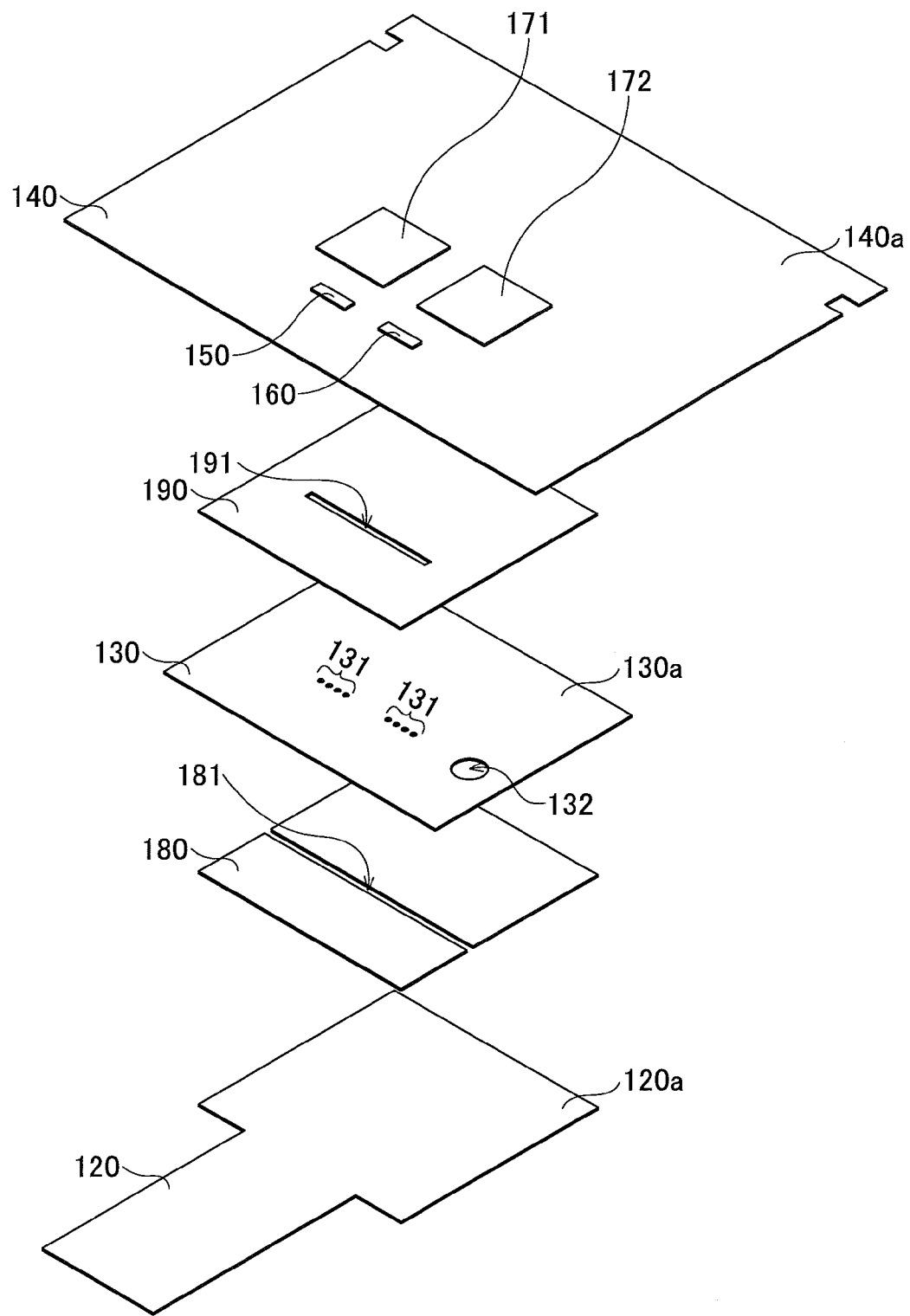
FIG. 7 is an exploded perspective view of the optical waveguide module of the first embodiment.
Figure 8A:
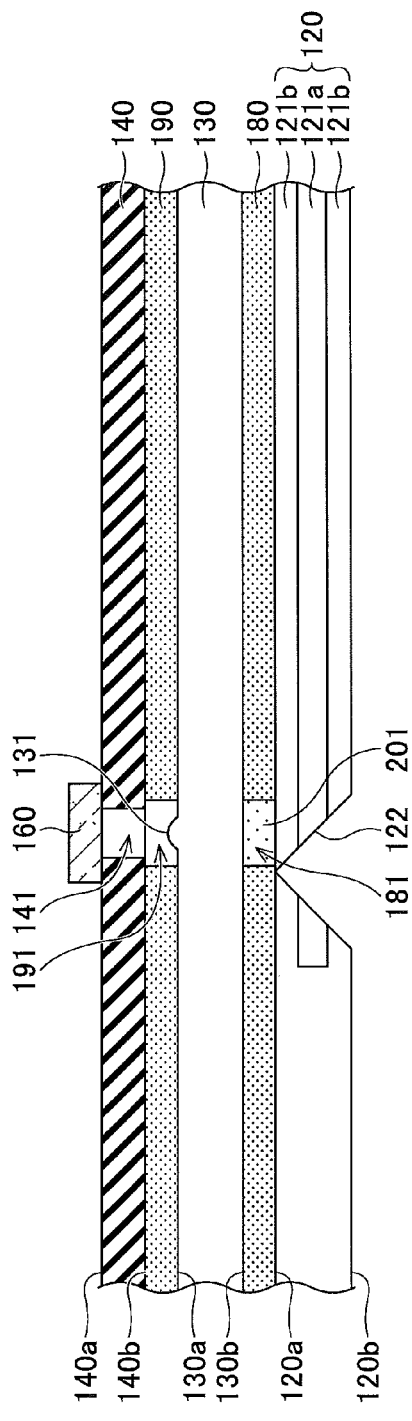
FIG. 8A and FIG. 8B are cross-sectional views of the optical waveguide module of the first embodiment.
Figure 8B:
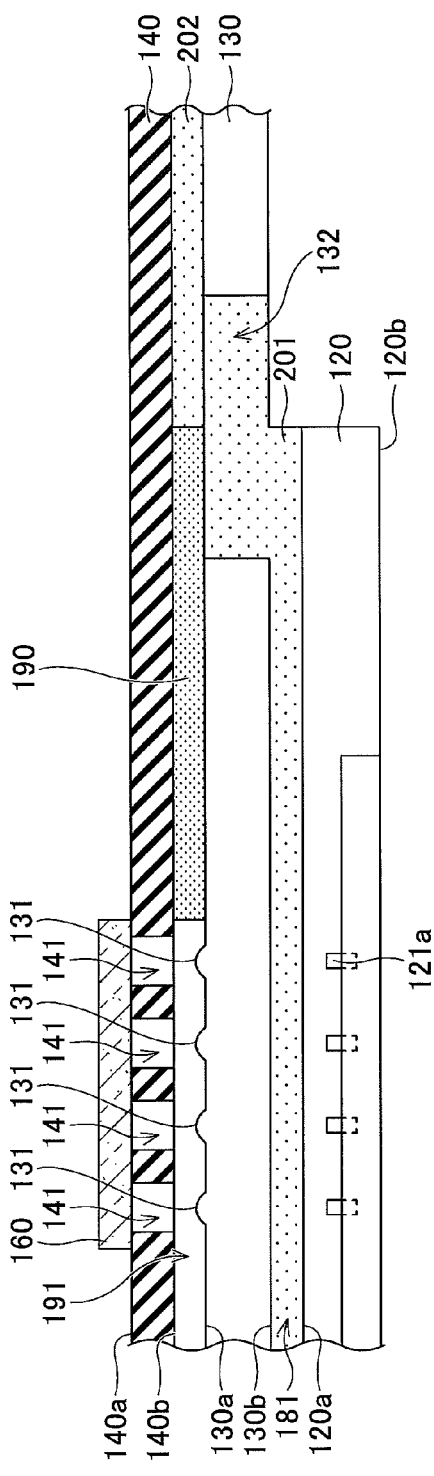
Figure 9A:
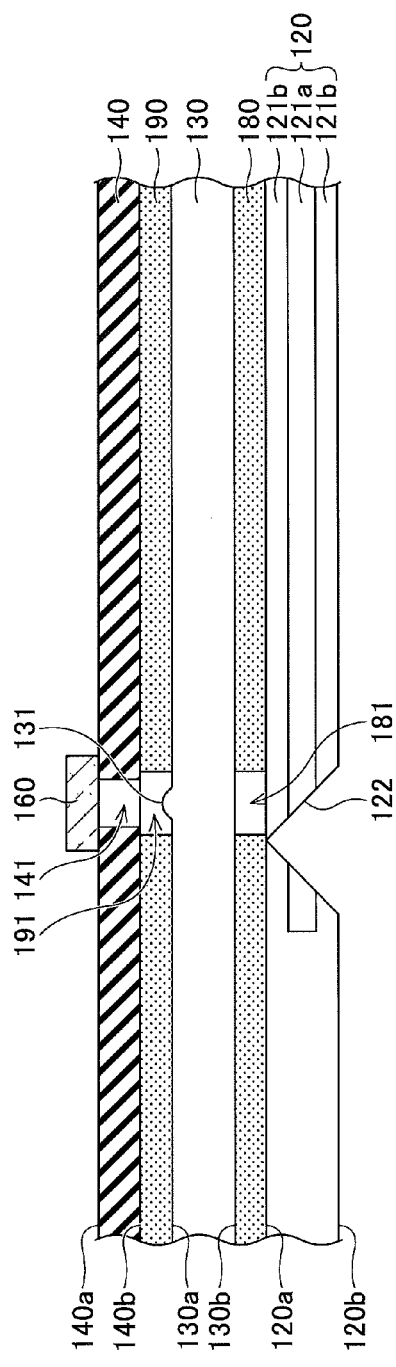
FIG. 9A and FIG. 9B are cross-sectional views of the optical waveguide module of the first embodiment.
Figure 9B:
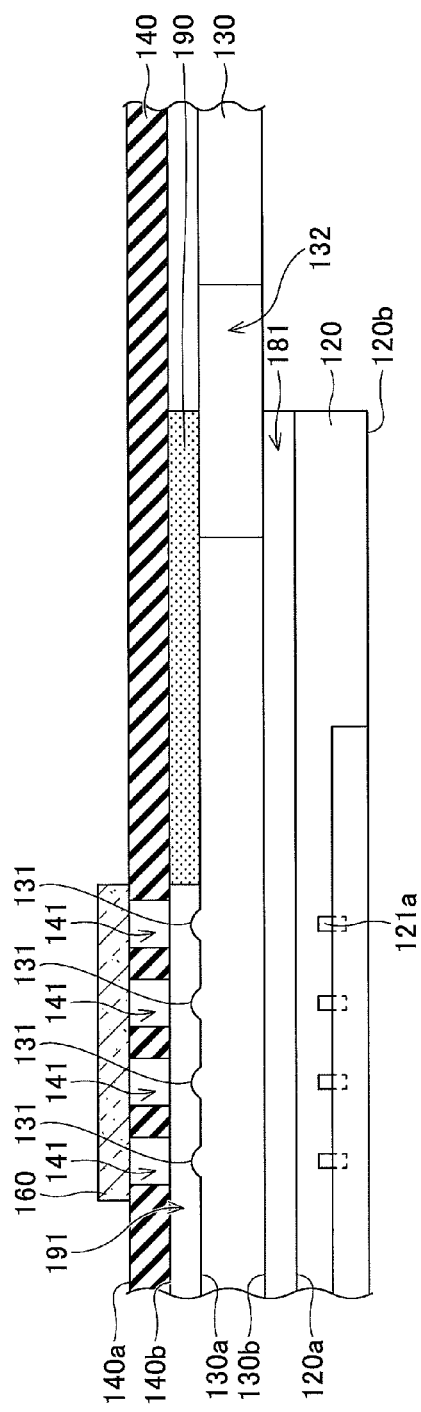

FIG. 6 is a perspective view of the optical waveguide module of the embodiment seen from the optical waveguide 120, and FIG. 7 is an exploded perspective view of the optical waveguide module of the embodiment. FIG. 8A is a cross-sectional view of FIG. 6 taken along a chain line 6A-6B, and FIG. 8B is a cross-sectional view of FIG. 6 taken along a chain line 6C-6D. FIG. 9A and FIG. 9B are cross-sectional views respectively corresponding to FIG. 8A and FIG. 8B under a state at which an adhesive agent is not supplied. FIG. 9A is a cross-sectional view of FIG. 6 taken along the chain line 6A-6B under a state at which the adhesive agent is not supplied, and FIG. 9B is a cross-sectional view of FIG. 6 taken along the chain line 6C-6D under a state at which the adhesive agent is not supplied.

The optical waveguide module of the embodiment is obtained by adhering a flexible substrate 140 and a lens sheet 130, and the lens sheet 130 and an optical waveguide 120 using both adhesion sheets and adhesive agents to be fixed.

As described above, when manufacturing the optical waveguide module, it is necessary to fix parts of the optical waveguide module so as not to change positional relationships between the parts. Meanwhile, it is necessary to control a thickness of the adhesion layer in order to set a distance between parts in a thickness direction. Thus, in this embodiment, an adhesive agent whose fixing force is strong, and a sheet of a tackiness agent by which the thickness can be easily controlled are used at the same time to adhere parts of the optical waveguide module.

As illustrated in FIG. 6 FIG. 9B, the optical waveguide module of the embodiment is formed by stacking the lens sheet 130 and the flexible substrate (substrate) 140 on the optical waveguide 120 in a sheet form. The optical waveguide 120 of the embodiment has a structure in which cores 121a provided at a center portion is sandwiched by clads 121b to be surrounded. A ferrule with a lens, not illustrated in the drawings, is connected to one end of the optical waveguide 120. A plurality of lenses 131 are aligned in a line at a surface 130a of the lens sheet 130. A surface 120a of the optical waveguide 120 and a surface 130b of the lens sheet 130 are adhered by an adhesion sheet 180. Here, a mirror 122 is formed at the optical waveguide 120 near another end of the optical waveguide 120 by removing a part of the optical waveguide 120 from a surface 120b in a V-shape.

The adhesion sheet 180 of the embodiment is divided into two. As illustrated in FIG. 7, FIG. 9A and FIG. 9B, a groove 181, which functions as an adhesive agent introducing area, is provided at an area corresponding to the mirror 122 of the optical waveguide 120, and the lenses 131 of the lens sheet 130, in other words, an area to be optical paths.

As illustrated in FIG. 8A and FIG. 8B, an adhesive agent 201 is introduced in the groove 181. The optical waveguide 120 and the lens sheet 130, in particular, positions where the mirror 122 and the lenses 131 are formed are fixed by the adhesive agent 201 introduced in the groove 181. The width of the groove 181 is set such that the supplied adhesive agent 201 can spread by capillarity, and to be greater than the diameter of each of the lenses 131.

As illustrated in FIG. 7, for example, the lens sheet 130 is formed to be wider than the adhesion sheet 180. The lens sheet 130 is provided with a through-hole 132 at a position above the groove 181 when the lens sheet 130 is adhered to the optical waveguide 120 by the adhesion sheet 180, for supplying the adhesive agent 201 to the groove 181. Here, the chain line 6C-6D of FIG. 6 is passing on the groove 181 of the adhesion sheet 180.

Wirings, not illustrated in the drawings, are formed in the substrate 140, and a light emitting element 150, a light receiving element 160, a driver 171 and a TIA 172 are mounted on a surface 140*a* of the substrate 140. The light emitting element 150 includes a plurality of light emitting portions, and is a VCSEL, for example. The light receiving element 160 includes a plurality of light receiving portions, and is a photodiode, for example. The driver 171 is an IC for driving the light emitting element 150. The TIA 172 is an IC for converting current generated by light detected by the light receiving portions of the light receiving element 160 to voltage.

The substrate 140 is provided with through-holes 141 aligned in a line at optical paths of light emitted from the light emitting portions of the light emitting element 150, and light injected into the light receiving portions of the light receiving element 160. The surface 130*a* of the lens sheet 130 and a surface 140*b* of the substrate 140 are adhered by an adhesion sheet 190. The light emitting element 150, the light receiving element 160, the driver 171 and the TIA 172 mounted on the surface 140*a* of the substrate 140 are connected to the wirings formed in the substrate 140 through bumps made of a material such as gold.

The adhesion sheet 190 is provided with an opening 191 at an area where the lenses 131 are formed and an area where the light emitting portions of the light emitting element 150 and the light receiving portions of the light receiving element 160 are provided. The size of the adhesion sheet 190 is smaller than that of each of the lens sheet 130 and the substrate 140, in other words, the lens sheet 130 is formed to be wider than the adhesion sheet 190. Thus, as illustrated in FIG. 8B, there is a space between the lens sheet 130 and the substrate 140 outside an edge of the adhesion sheet 190. Therefore, after the lens sheet 130 and the substrate 140 are adhered by the adhesion sheet 190, by supplying an adhesive agent 202 at the space between the lens sheet 130 and the substrate 140 outside the edge of the adhesion sheet 190, the lens sheet 130 and the substrate 140 can be furthermore adhered and fixed by the adhesive agent 202. As the lenses 131 are surrounded by the adhesion sheet 190, the lenses 131 are prevented from the adhesive agent 202 to be attached.

Here, each of the adhesion sheets 180 and 190 is, for example, a transparent double sided tape including adhesion layers at both surfaces. Further, according to the embodiment, an example is described in which ultraviolet (UV) curing resin is used as the adhesive agents 201 and 202. Alternatively, another type of adhesive agent such as thermosetting resin may be used. Here, each of the adhesive agents 201 and 202 is a resin material transparent to light.

In the optical waveguide module, the substrate 140, the lens sheet 130 and the optical waveguide 120 are stuck and adhered by the adhesion sheets 180 and 190, and further fixed by the adhesive agents 201 and 202, respectively, under a state that the light emitting portions of the light emitting element 150 and the light receiving portions of the light receiving element 160, the through-holes 141 of the substrate 140, the lenses 131 of the lens sheet 130 and the mirror 122 formed in the optical waveguide 120 are aligned. Specifically, as illustrated in FIG. 8A and FIG. 8B, the substrate 140, the lens sheet 130 and the optical waveguide 120 are adhered by the adhesion sheets 180 and 190 under a state that the light emitting portions of the light emitting element 150/light receiving portions of the light receiving element 160, the through-holes 141, the lenses 131 and the mirror 122 are aligned, and thereafter, fixed by the adhesive agents 201 and 202, respectively.

In the optical waveguide module, the substrate 140 is connected to an FPC connector provided in a substrate in a QSFP optical module. Thus, due to deflection or the like of the optical waveguide 120, force may be applied to the optical waveguide 120. However, according to the optical waveguide module of the embodiment, the lens sheet 130 and the optical waveguide 120 are fixed by the adhesive agent 201, and the substrate 140 and the lens sheet 130 are fixed by the adhesive agent 202. Thus, the lens sheet 130 does not move with respect to the optical waveguide 120, and the substrate 140 does not move with respect to the lens sheet 130, and positional displacement does not occur.

Further, the adhesion sheet 180 is provided between the optical waveguide 120 and the lens sheet 130, and the adhesion sheet 190 is provided between the lens sheet 130 and the substrate 140. Thus, by the adhesion sheets 180 and 190, each of the lens sheet 130 and the mirror 122, and the lens sheet 130 and the light emitting element 150/light receiving element 160 can be retained at a predetermined distance.

As such, by using the adhesive agents and the adhesion sheets at the same time, positional relationships between the parts can be kept while surely fixing the parts.

(Method of Manufacturing Optical Waveguide Module)

Next, a method of manufacturing the optical waveguide module of the embodiment is described with reference to FIG. 10A to FIG. 12.

Figure 10A:
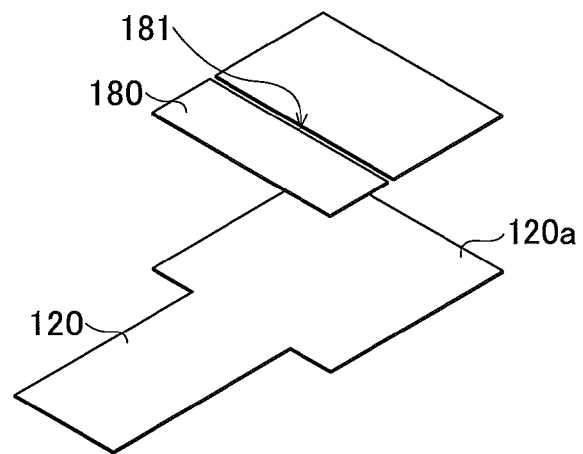
FIG. 10A to FIG. 10C are views illustrating steps of a method of manufacturing the optical waveguide module of the first embodiment.

As illustrated in FIG. 10A, one surface of the adhesion sheet 180 is adhered to the surface 120*a* of the optical waveguide 120. At this time, the adhesion sheet 180 and the optical waveguide 120 are aligned such that a position of the mirror 122 provided in the optical waveguide 120 and a position of the groove 181 of the adhesion sheet 180 are matched. When the diameter of each of the lenses 131 is 100 µm, the width of the groove 181 is about 100 µm, or greater than or equal to 100 µm, for example.

Figure 10B:
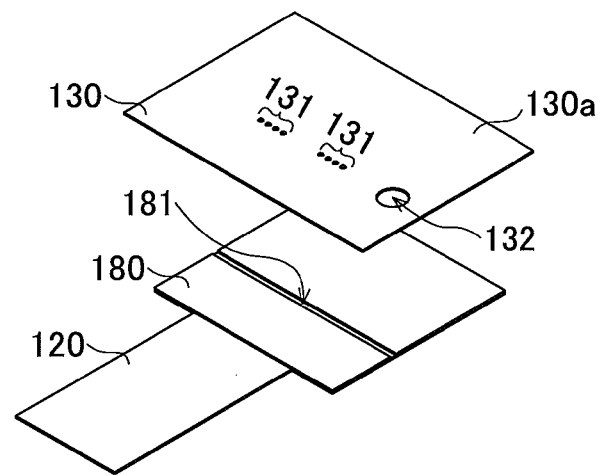

Next, as illustrated in FIG. 10B, the surface 130*b* of the lens sheet 130 is adhered to another surface of the adhesion sheet 180. At this time, the lens sheet 130 and the adhesion sheet 180 are aligned such that the position of the mirror 122 provided in the optical waveguide 120 and a position of the lenses 131 of the lens sheet 130 are matched. With this, the position of the groove 181 and the position of the lenses 131 are matched, and the through-hole 132 of the lens sheet 130 is positioned above an end portion of the groove 181.

Figure 10C:
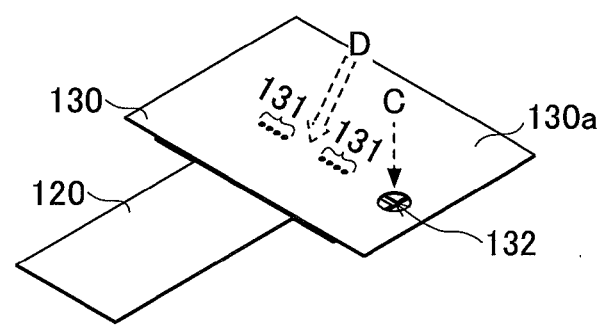

Next, as illustrated in FIG. 10C, as illustrated by a broken line arrow C, UV curing resin as the adhesive agent 201 is supplied from the surface 130*a* of the lens sheet 130 into the through-hole 132. The adhesive agent 201 supplied from the through-hole 132 spreads in the groove 181 by capillarity to fill the groove 181. Thereafter, as illustrated by a broken line arrow D, UV is irradiated from the surface 130*a*. As the lens sheet 130 transmits UV, the adhesive agent filled in the groove 181 can be cured. As such, the optical waveguide 120 and the lens sheet 130 are adhered and fixed by the cured adhesive agent 201.

Figure 11A:
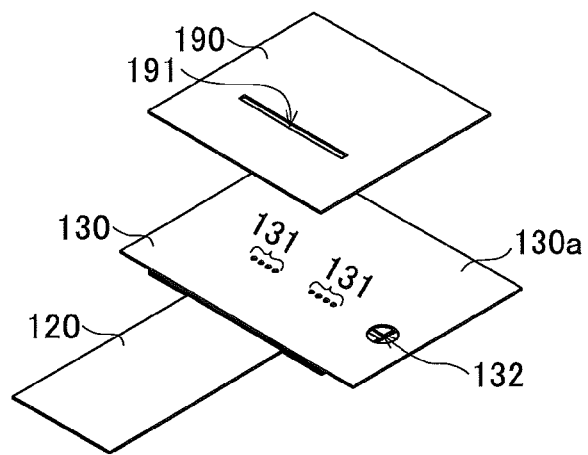
FIG. 11A to FIG. 11C are views illustrating steps of the method of manufacturing the optical waveguide module of the first embodiment.
Figure 11B:
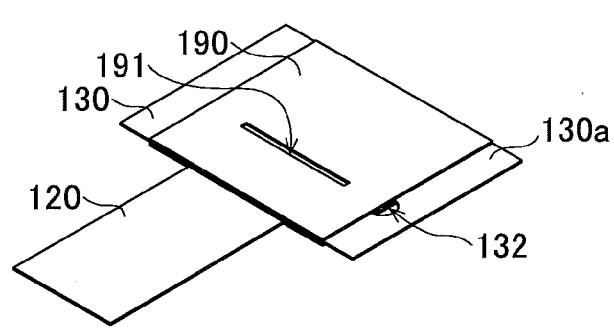

Next, as illustrated in FIG. 11A, after aligning such that the position of the lenses 131 and a position of the opening 191 formed in the adhesion sheet 190 are matched, the adhesion sheet 190 is adhered to the surface 130*a* of the lens sheet 130. FIG. 11B illustrates the lens sheet 130 to which the adhesion sheet 190 is adhered. Under the state of FIG. 11B, both side portions of the lens sheet 130 are exposed.

Figure 11C:
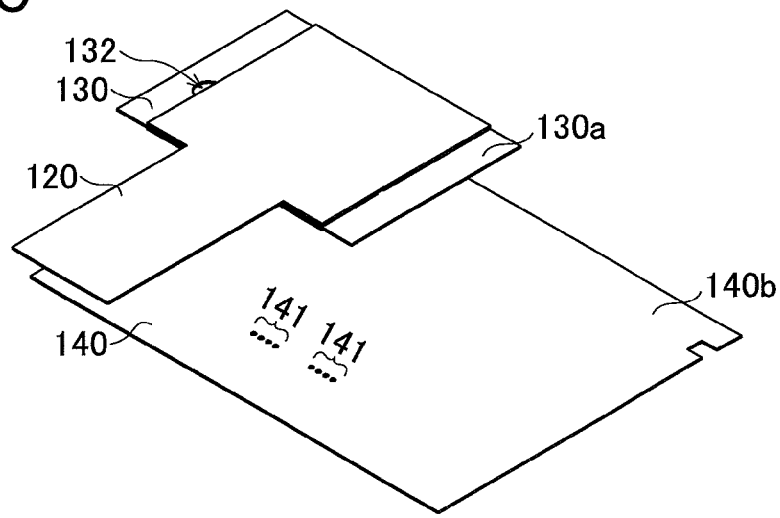

Next, as illustrated in FIG. 11C, the surface 140*b* of the substrate 140 is adhered to another surface of the adhesion sheet 190. At this time, the substrate 140 and the adhesion sheet 190 are aligned such that a position of the through-holes 141 of the substrate 140 and the position of the lenses 131 are matched. FIG. 11C illustrates a state in which the adhesion sheet 190 of FIG. 11B is reversed and is to be adhered to the substrate 140. Under this state, spaces are formed between the both side portions of the lens sheet 130 and the substrate 140, respectively.

Figure 12:
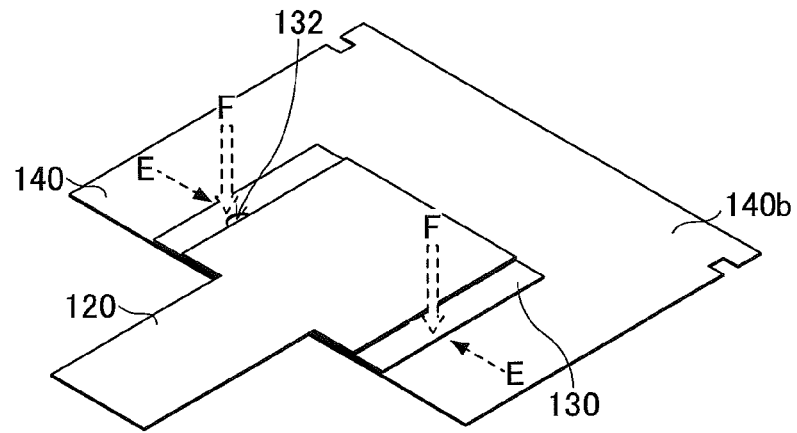
FIG. 12 is a view illustrating a step of the method of manufacturing the optical waveguide module of the first embodiment.

Next, as illustrated in FIG. 12, as illustrated by broken line arrows E, UV curing resin as the adhesive agent 202 is supplied from the spaces between the surface 130a of the lens sheet 130 and the surface 140b of the substrate 140. After spreading the adhesive agent 202 between the lens sheet 130 and the substrate 140, as illustrated by broken line arrows F, UV is irradiated from the surface 130b. The adhesive agent 202 between the lens sheet 130 and the substrate 140 is cured by UV transmitted through the lens sheet 130, and the lens sheet 130 and the substrate 140 are furthermore adhered.

As described above, according to the optical waveguide module of the embodiment, after adhering the optical waveguide 120 and the lens sheet 130 by the adhesion sheet 180, the optical waveguide 120 and the lens sheet 130 are furthermore adhered by supplying the adhesive agent 201 in the groove 181 of the adhesion sheet 180. The distance between the optical waveguide 120 and the lens sheet 130 is kept at a thickness of the adhesion sheet 180, and the distance does not change. Similarly, as the lens sheet 130 and the substrate 140 are adhered by supplying the adhesive agent 202 between the lens sheet 130 and the substrate 140 after adhering the lens sheet 130 and the substrate 140 by the adhesion sheet 190, the distance between the lens sheet 130 and the substrate 140 is kept at a thickness of the adhesion sheet 190, and the distance does not change. Thus, optical loss does not occur even when adhering by the adhesive agents.

Further, according to the embodiment, as the optical waveguide 120 and the lens sheet 130 are adhered by the adhesive agent 201, the optical waveguide 120 and the lens sheet 130 are strongly fixed compared with a case when they are adhered only by an adhesion sheet. Thus, even if force is applied to the optical waveguide 120, the lens sheet 130 does not move with respect to the optical waveguide 120. Similarly, as the lens sheet 130 and the substrate 140 are adhered by the adhesive agent 202, the substrate 140 does not move with respect to the lens sheet 130. Thus, the optical waveguide module with high reliability can be obtained.

Second Embodiment

Next, an optical waveguide module of a second embodiment is described with reference to FIG. 13 to FIG. 16B.

Figure 13:
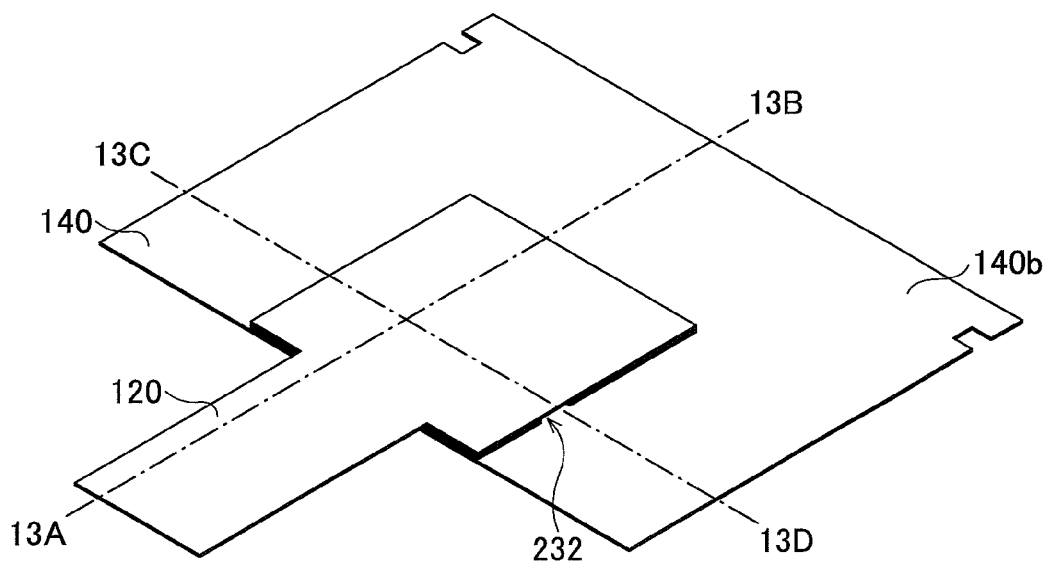
FIG. 13 is a perspective view of an optical waveguide module of a second embodiment.
Figure 14:
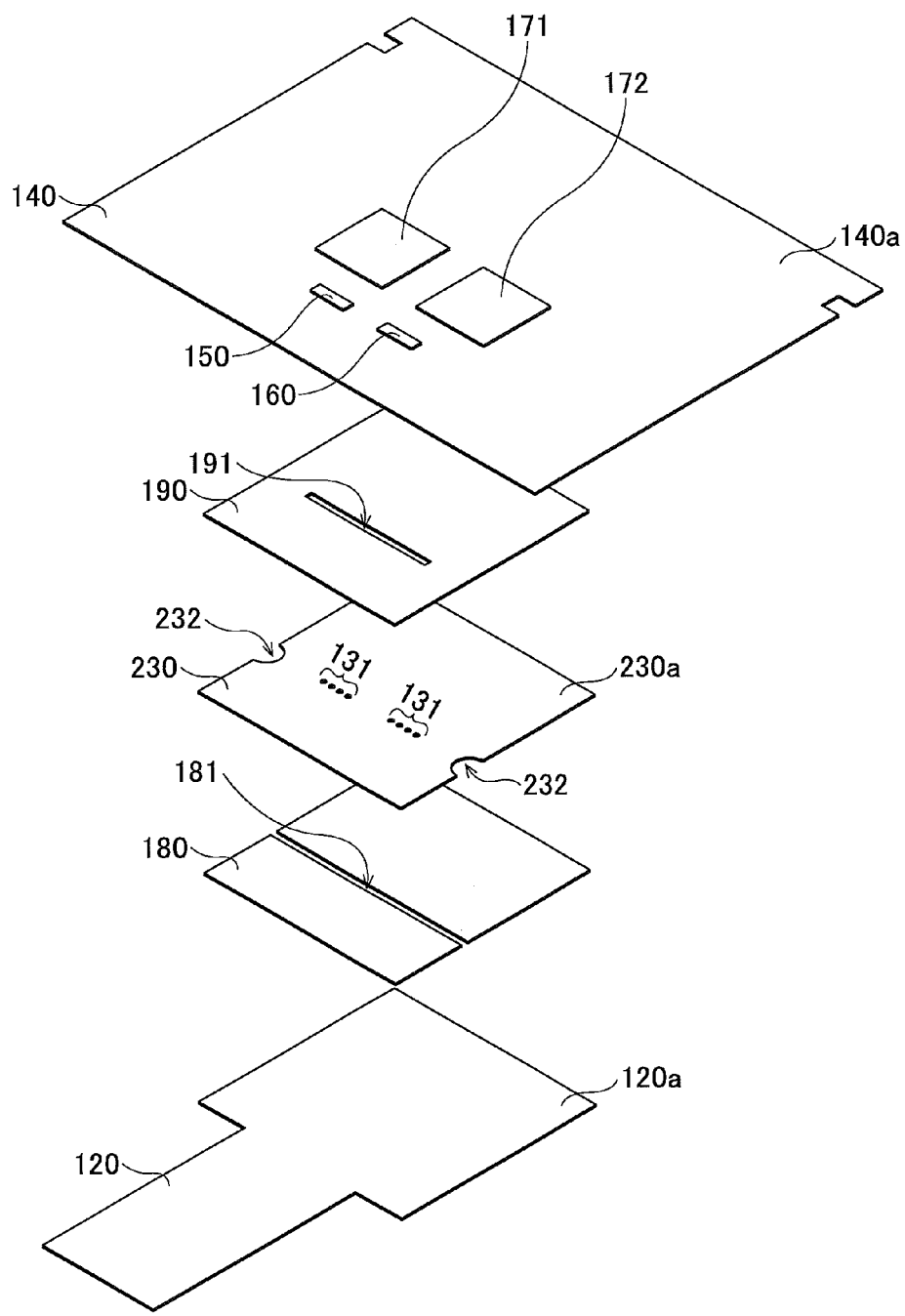
FIG. 14 is an exploded perspective view of the optical waveguide module of the second embodiment.
Figure 16A:
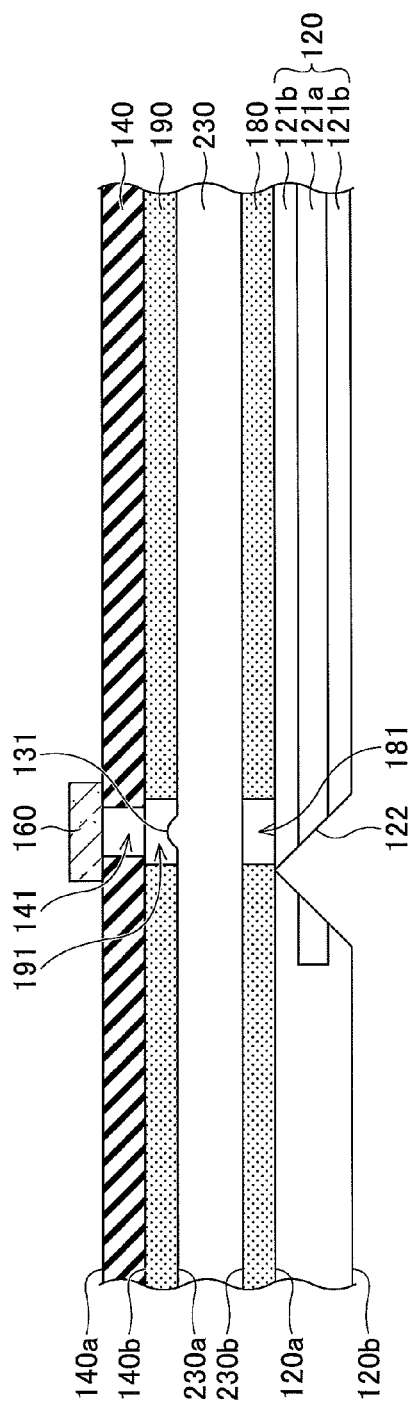
FIG. 16A and FIG. 16B are cross-sectional views of the optical waveguide module of the second embodiment.
Figure 16B:
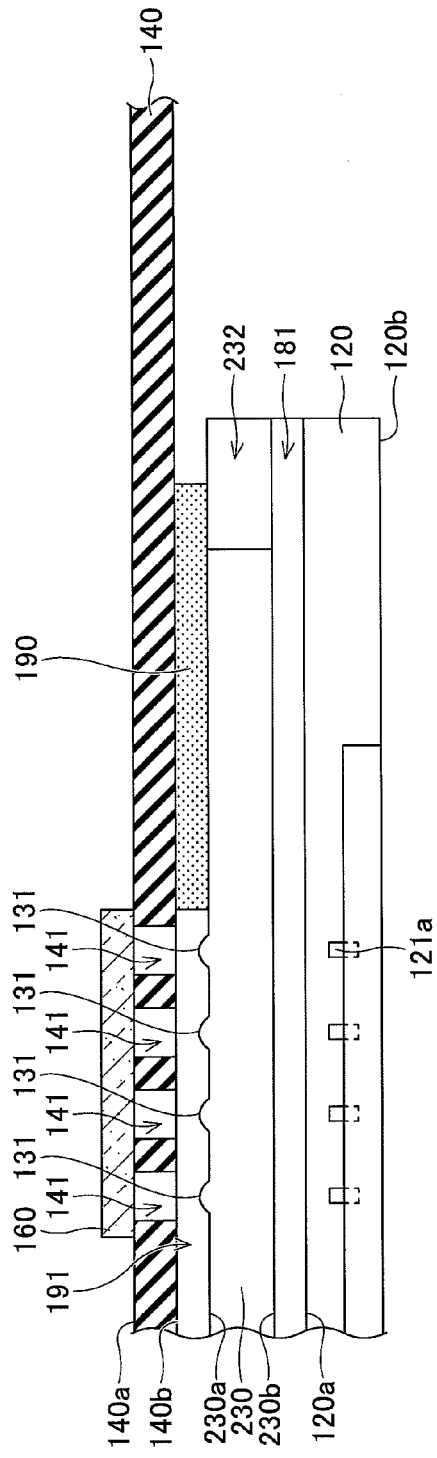

FIG. 13 is a perspective view of the optical waveguide module of the embodiment, and FIG. 14 is an exploded perspective view. FIG. 15A is a cross-sectional view of FIG. 13 taken along a chain line 13A-13B, and FIG. 15B is a cross-sectional view of FIG. 13 taken along a chain line 13C-13D. FIG. 16A and FIG. 16B are cross-sectional views of the optical waveguide module under a state at which an adhesive agent is not supplied. FIG. 16A is a cross-sectional view of FIG. 13 taken along the chain line 13A-13B, and FIG. 16B is a cross-sectional view of FIG. 13 taken along the chain line 13C-13D. In the optical waveguide module of the embodiment, notch portions 232 are provided at sides of a lens sheet 230.

The optical waveguide module illustrated in FIG. 13 to FIG. 16C is formed by stacking the lens sheet 230 and the substrate 140 on the optical waveguide 120. The optical waveguide 120 and the lens sheet 230 are adhered by the adhesion sheet 180. Similar to the first embodiment, the adhesion sheet 180 of the embodiment is divided into two, and the adhesion sheet 180 is provided such that the groove 181 is formed. The optical waveguide 120 and the lens sheet 230 are adhered and fixed by the adhesive agent 201 supplied to the groove 181.

The lens sheet 230 is provided with the notch portions 232 at both sides for supplying the adhesive agent 201 to the groove 181 after adhering the lens sheet 230 and the optical waveguide 120 by the adhesion sheet 180. The two notch portions 232 are formed at positions at both sides of the lenses 131 that are aligned on a line while interposing the lenses 131 therebetween.

The lens sheet 230 and the substrate 140 are adhered by the adhesion sheet 190. The adhesion sheet 190 is provided with the opening 191 at an area where the lenses 131 of the lens sheet 230 and an area where the light emitting portions of the light emitting element 150 and the light receiving portions of the light receiving element 160 are provided so as to surround the lenses 131.

The adhesion sheet 190 is made smaller than each of the lens sheet 230 and the substrate 140. In particular, by setting the width of the adhesion sheet 190 (an extended direction of the opening 191) to be smaller than the width of the lens sheet 230, as illustrated in FIG. 16B, a space is formed between the lens sheet 230 and the substrate 140 outside an edge of the adhesion sheet 190 when the lens sheet 230 and the substrate 140 are adhered by the adhesion sheet 190. After the lens sheet 230 and the substrate 140 are adhered by the adhesion sheet 190, by supplying the adhesive agent 202 to the space formed between the lens sheet 230 and the substrate 140 outside the edge of the adhesion sheet 190, the adhesive agent 202 is filled in the space by capillarity, and the lens sheet 230 and the substrate 140 can be furthermore adhered and fixed by the adhesive agent 202.

In the optical waveguide module of the embodiment, the optical waveguide 120 and the lens sheet 230 are adhered by the adhesion sheet 180. Thereafter, the adhesive agent 201 is supplied from the two notch portions 232 in the groove 181, and the adhesive agent 201 is cured. With this, the optical waveguide 120 and the lens sheet 230, in particular, positions where the mirror 122 and the lenses 131 are formed are fixed by the adhesive agent 201. Thus, the lens sheet 230 can be prevented from moving with respect to the optical waveguide 120.

Further, the substrate 140 and the lens sheet 230 are adhered by the adhesion sheet 190, and thereafter, the adhesive agent 202 is supplied in the space between the lens sheet 230 and the substrate 140 to fix the lens sheet 230 and the substrate 140. Thus, the lens sheet 230 can be prevented from moving with respect to the substrate 140.

Structures other than described above are the same as those of the first embodiment.

Third Embodiment (Optical Waveguide Module)

Next, an optical waveguide module of a third embodiment is described with reference to FIG. 17 to FIG. 20B.

Figure 17:
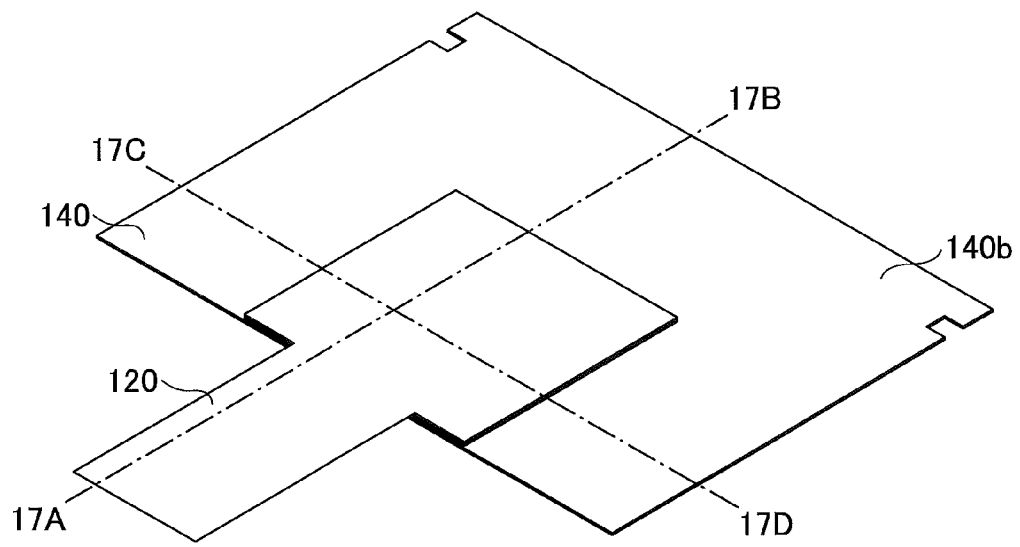
FIG. 17 is a perspective view of an optical waveguide module of a third embodiment.
Figure 18:
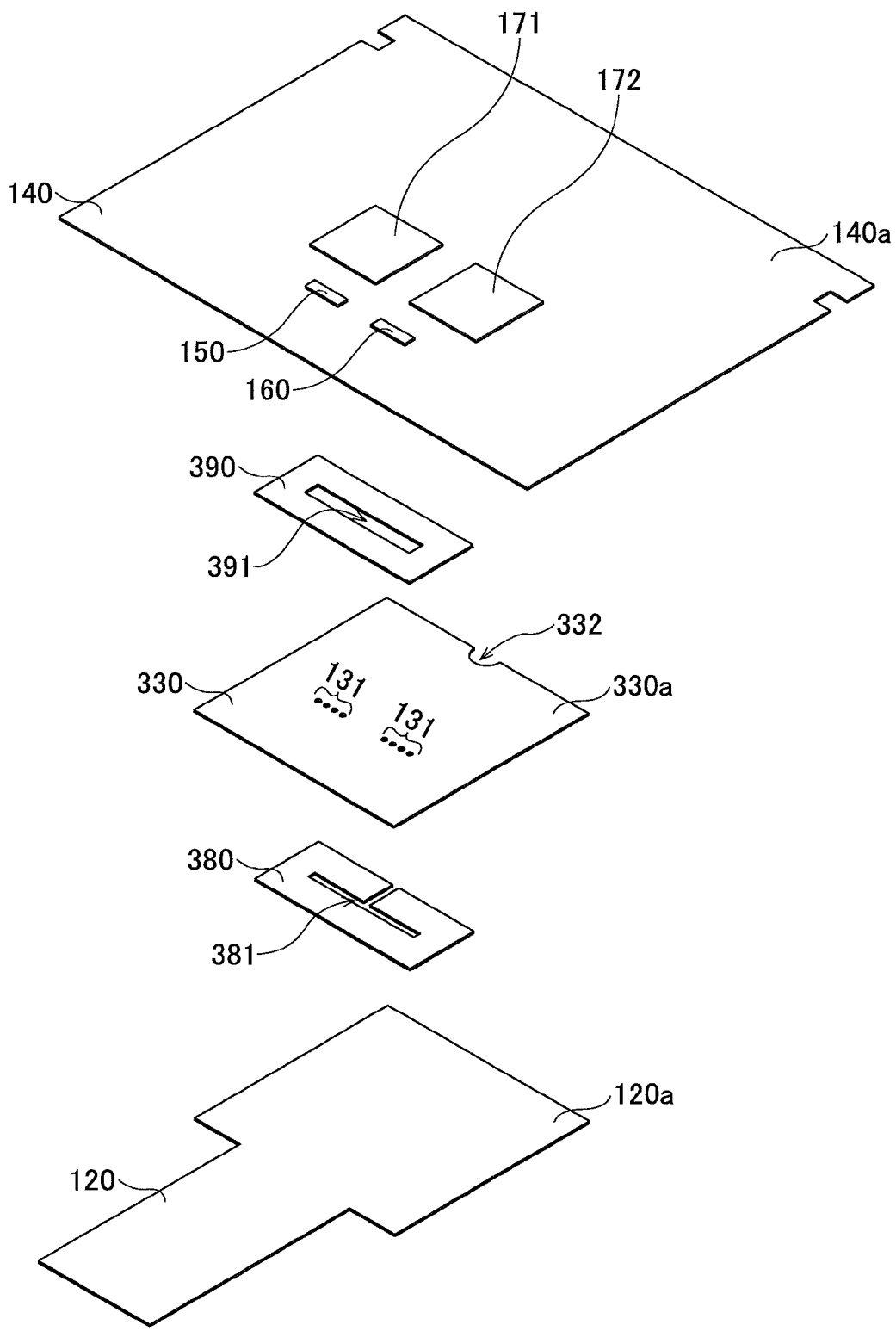
FIG. 18 is an exploded perspective view of the optical waveguide module of the third embodiment.
Figure 19A:
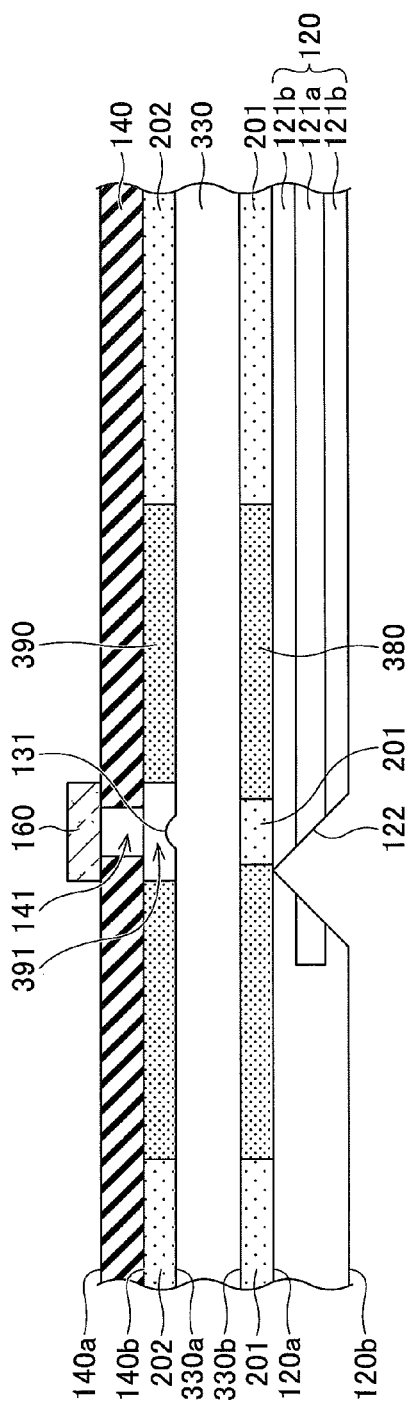
FIG. 19A and FIG. 19B are cross-sectional views of the optical waveguide module of the third embodiment.
Figure 19B:
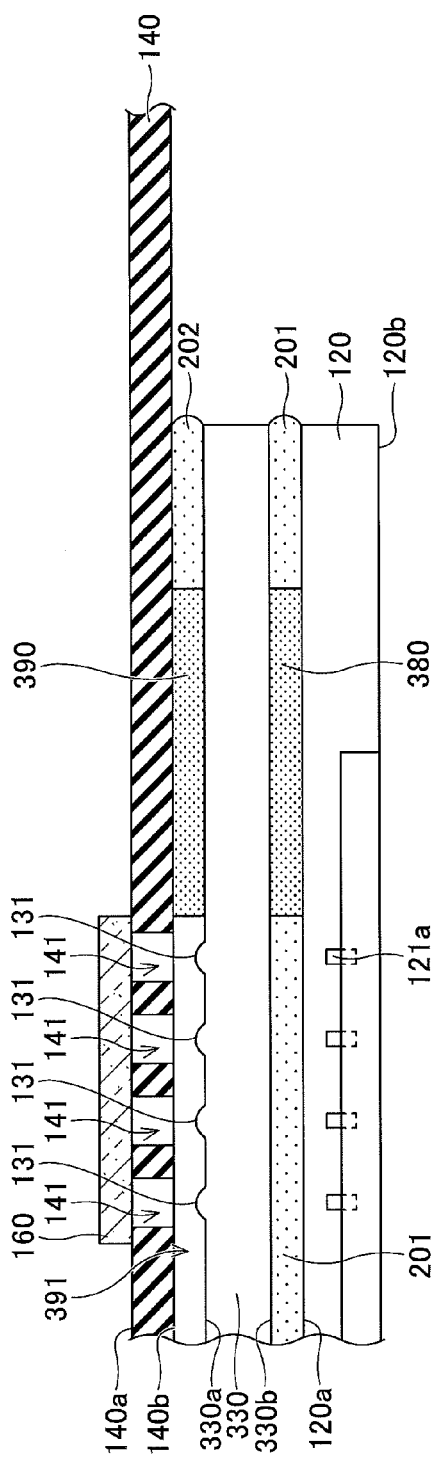

FIG. 17 is a perspective view of the optical waveguide module of the embodiment seen from the optical waveguide 120, and FIG. 18 is an exploded perspective view. FIG. 19A is a cross-sectional view of FIG. 17 taken along a chain line 17A-17B, and FIG. 19B is a cross-sectional view of FIG. 17 taken along a chain line 17C-17D. FIG. 20A and FIG. 20B are cross-sectional views of the optical waveguide module under a state at which the adhesive agents 201 and 202 are not supplied. FIG. 20A is a cross-sectional view of FIG. 17 taken along the chain line 17A-17B, and FIG. 20B is a cross-sectional view of FIG. 17 taken along the chain line 17C-17D.

As illustrated in FIG. 17 to FIG. 20B, the optical waveguide module of the embodiment is formed by stacking a lens sheet 330 and the substrate 140 on the optical waveguide 120 in a sheet form.

In the optical waveguide module of the embodiment, a plurality of lenses 131 are formed on one surface 330a of the lens sheet 330, and the optical waveguide 120 and the lens sheet 330 are adhered by an adhesion sheet 380. The adhesion sheet 380 is provided with a groove 381, which functions as an adhesive agent introducing area. The groove 381 is formed to have a substantially T-shape including a first portion formed at an area corresponding to the mirror 122 of the optical waveguide 120, and the lenses 131 of the lens sheet 330, and a second portion. One end of the second portion is extending from a substantially middle portion of the first portion in a direction perpendicular to the first portion. Another end of the second portion is formed to be an open portion at an outer edge of the adhesion sheet 380. The optical waveguide 120 and the lens sheet 330 are furthermore adhered and fixed by the adhesive agent 201 introduced in the groove 381. Further, the lens sheet 330 is provided with a notch portion 332 for supplying the adhesive agent 201 in the groove 381.

In order to control the thickness (distance) between lenses and an optical waveguide, an adhesion sheet may be provided at least around the lenses. Thus, the adhesion sheet 380 of the embodiment is formed to be smaller than each of the lens sheet 330 and the optical waveguide 120. Further, by forming the adhesion sheet 380 to be smaller, when adhering the optical waveguide 120 and the lens sheet 330 by the adhesive agent 201, the adhesive agent 201 can be supplied not only in the groove 381 but also in a space between the optical waveguide 120 and the lens sheet 330 around the adhesion sheet 380. With this, adhesion between the optical waveguide 120 and the lens sheet 330 can be strengthened.

The substrate 140 is provided with the through-holes 141 at optical paths of light emitted from the light emitting portions of the light emitting element 150, and light injected into the light receiving portions of the light receiving element 160. The lens sheet 330 and the substrate 140 are adhered by an adhesion sheet 390.

The adhesion sheet 390 is provided with an open portion 391 at an area where the lenses 131 of the lens sheet 330 are formed. Further, similar to the adhesion sheet 380, as a distance between the lens sheet 330 and the substrate 140 in a thickness direction can be controlled as long as the adhesion sheet 390 has a size that can surround the lenses 131, the adhesion sheet 390 is formed to be smaller than each of the lens sheet 330 and the substrate 140. After the lens sheet 330 and the substrate 140 are adhered by the adhesion sheet 390, by supplying the adhesive agent 202 from outside the lens sheet 330, the adhesive agent 202 can be introduced in a space between the lens sheet 330 and the substrate 140 around the adhesion sheet 390. By curing the adhesive agent 202 introduced in the space between the lens sheet 330 and the substrate 140 around the adhesion sheet 390, the lens sheet 330 and the substrate 140 are furthermore adhered and fixed.

Here, each of the adhesion sheets 380 and 390 is, for example, a transparent double sided tape or the like.

In the optical waveguide module of the embodiment, the optical waveguide 120, the lens sheet 330 and the substrate 140 are adhered by the adhesion sheets 380 and 390, respectively, under a state that the light emitting portions of the light emitting element 150 and the light receiving portions of the light receiving element 160, the through-holes 141, the lenses 131 and the mirror 122 are aligned. Furthermore, the optical waveguide 120, the lens sheet 330 and the substrate 140 are fixed by the adhesive agents 201 and 202, respectively.

According to the optical waveguide module of the embodiment, the lens sheet 330 and the optical waveguide 120 are fixed by the adhesive agent 201, in particular, the portion where the lenses 131 are formed is fixed by the adhesive agent 201 supplied in the groove 381. Further, the substrate 140 and the lens sheet 330 are fixed by the adhesive agent 202. Thus, the lens sheet 330 is prevented from moving with respect to the optical waveguide 120 to cause positional displacement, and the substrate 140 is prevented from moving with respect to the lens sheet 330 to cause positional displacement.

(Manufacturing Method of Optical Waveguide Module)

Next, a method of manufacturing the optical waveguide module of the embodiment is described with reference to FIG. 21A to FIG. 23.

Figure 21A:
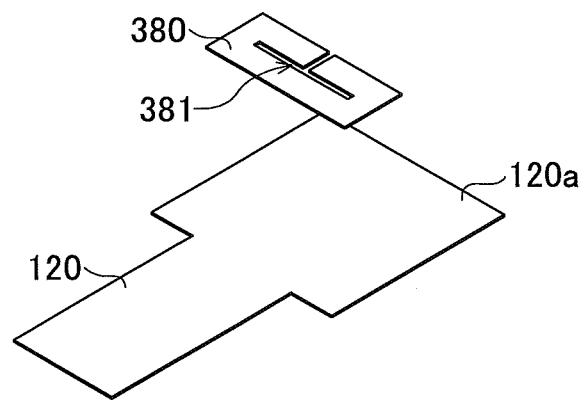
FIG. 21A to FIG. 21C are views illustrating steps of a method of manufacturing the optical waveguide module of the third embodiment.

First, as illustrated in FIG. 21A, the adhesion sheet 380 is adhered to the surface 120a of the optical waveguide 120. At this time, the adhesion sheet 380 and the optical waveguide 120 are adhered under a state that they are aligned such that the position of the mirror 122 provided in the optical waveguide 120 and the position of the groove 381 are matched. When the diameter of each of the lenses 131 is 100 μm, the width of the groove 381 formed in the adhesion sheet 380 is about 100 μm, or greater than or equal to 100 μm, for example.

Figure 21B:
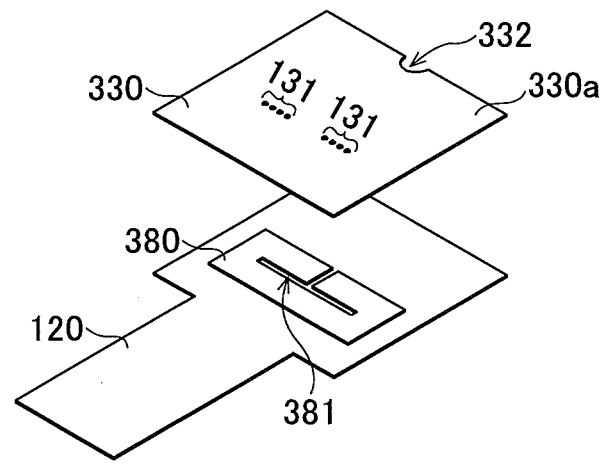

Next, as illustrated in FIG. 21B, the lens sheet 330 is adhered to another surface of the adhesion sheet 380. At this time, the lens sheet 330 and the adhesion sheet 380 are adhered under a state that the position of the mirror 122 and the position of the lenses 131 are matched. With this, the position of the groove 381 formed in the adhesion sheet 380 and the position of the lenses 131 are matched.

Figure 21C:
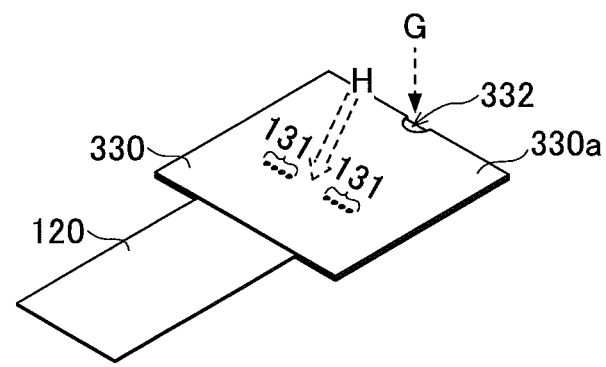

Next, as illustrated in FIG. 21C, as illustrated by a broken line arrow G, the adhesive agent 201 made of UV curing resin is supplied in the space between the lens sheet 330 and the optical waveguide 120 from the notch portion 332 of the lens sheet 330. The adhesive agent 201 supplied from the notch portion 332 spreads around the adhesion sheet 380 and spreads in the groove 381 by capillarity to fill the groove 381. Thereafter, as illustrated by a broken line arrow H, UV is irradiated to cure the adhesive agent 201 in the groove 381 and around the adhesion sheet 380. As such, the optical waveguide 120 and the lens sheet 330 are furthermore adhered and fixed by the cured adhesive agent 201.

Figure 22A:
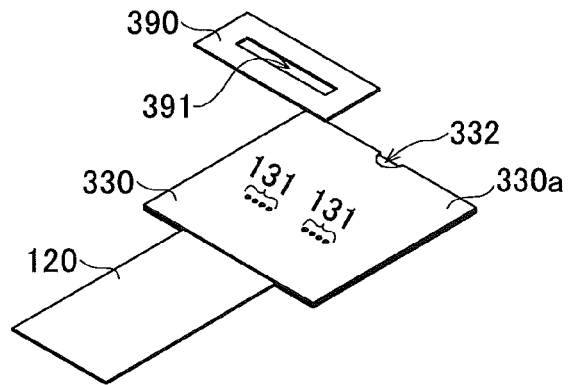
FIG. 22A to FIG. 22C are views illustrating steps of the method of manufacturing the optical waveguide module of the third embodiment.
Figure 22B:
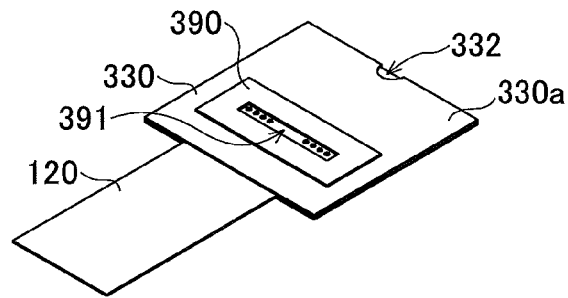

Next, as illustrated in FIG. 22A, after aligning such that the position of the lenses 131 and the position of the open portion 391 formed in the adhesion sheet 390 are matched, the adhesion sheet 390 is adhered to the surface 330a of the lens sheet 330. FIG. 22B illustrates a structure in which the adhesion sheet 390 is adhered to the lens sheet 330 as such.

Figure 22C:
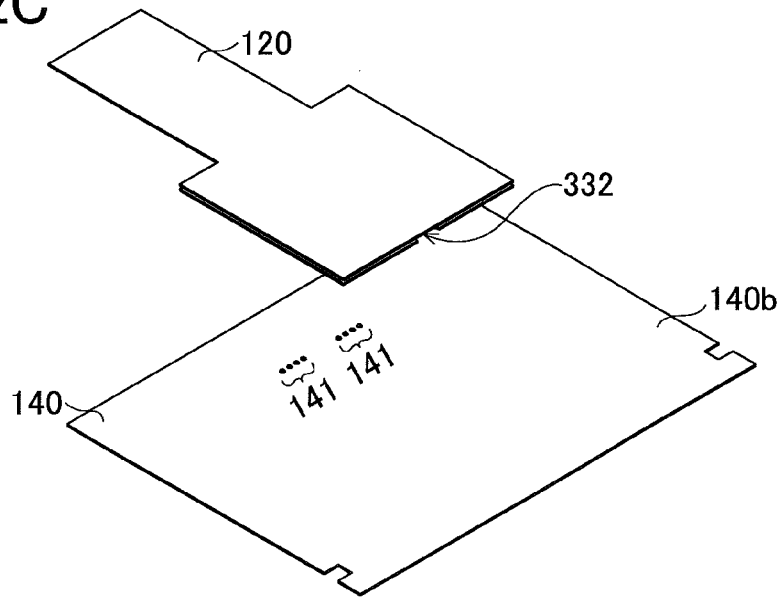

Next, as illustrated in FIG. 22C, the substrate 140 is adhered to another surface of the adhesion sheet 390. At this time, the substrate 140 and the adhesion sheet 390 are aligned such that the position of the through-holes 141 of the substrate 140 and the position of the lenses 131 are matched. FIG. 22C illustrates a state in which the structure of FIG. 22B, in which the adhesion sheet 390 is adhered, is reversed and to be adhered to the substrate 140.

Figure 23:
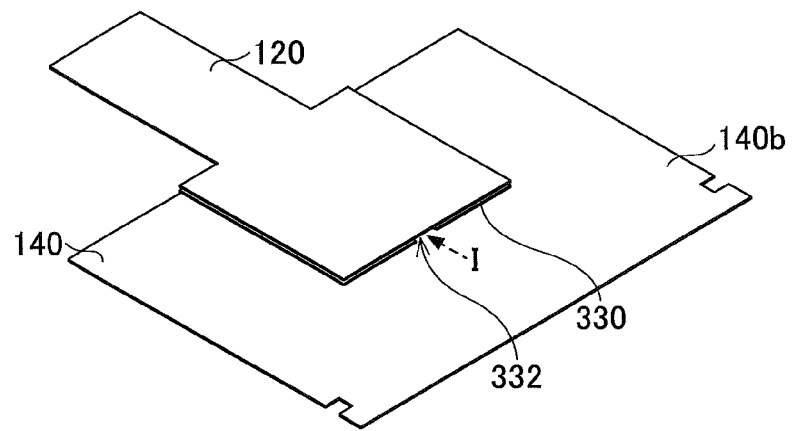
FIG. 23 is a view illustrating a step of the method of manufacturing the optical waveguide module of the third embodiment.

Next, as illustrated in FIG. 23, as illustrated by a broken line arrow I, the adhesive agent 202 made of thermosetting resin is supplied in the notch portion 332. After spreading the adhesive agent between 202 the lens sheet 330 and the substrate 140, the adhesive agent 202 is cured by applying heat. As such, the lens sheet 330 and the substrate 140 are furthermore adhered and fixed by the cured adhesive agent 202.

As described above, according to the optical waveguide module of the embodiment, after adhering the optical waveguide 120 and the lens sheet 330 by the adhesion sheet 380, the optical waveguide 120 and the lens sheet 330 are fixed by the adhesive agent 201 supplied in the groove 381. Thus, the distance between the optical waveguide 120 and the lens sheet 330 is kept at a thickness of the adhesion sheet 380, and the distance does not change. Further, after adhering the lens sheet 330 and the substrate 140 by the adhesion sheet 390, the lens sheet 330 and the substrate 140 are furthermore adhered by supplying the adhesive agent 202 between the lens sheet 330 and the substrate 140 from outside the lens sheet 330. Thus, the distance between the lens sheet 330 and the substrate 140 is kept at a thickness of the adhesion sheet 390, and the distance does not change. Thus, optical loss does not occur even when adhering by the adhesive agents.

Further, as the optical waveguide 120 and the lens sheet 330 are adhered by the adhesive agent 201, and further, the lens sheet 330 and the substrate 140 are adhered by the adhesive agent 202, even if force is applied to the optical waveguide 120 or the like, the lens sheet 330 does not move with respect to the optical waveguide 120 to cause positional displacement, and further, the substrate 140 does not move with respect to the lens sheet 330 to cause positional displacement.

Structures other than described above are the same as those of the first embodiment.

Fourth Embodiment (Optical Waveguide Module)

Next, an optical waveguide module of a fourth embodiment is described with reference to FIG. 24 to FIG. 27B.

Figure 24:
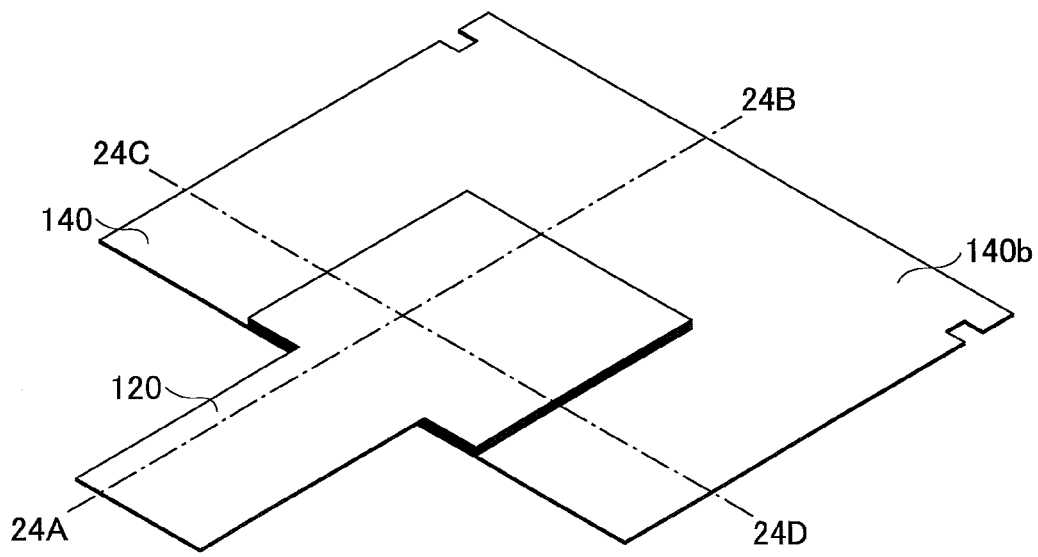
FIG. 24 is a perspective view of an optical waveguide module of a fourth embodiment.
Figure 25:
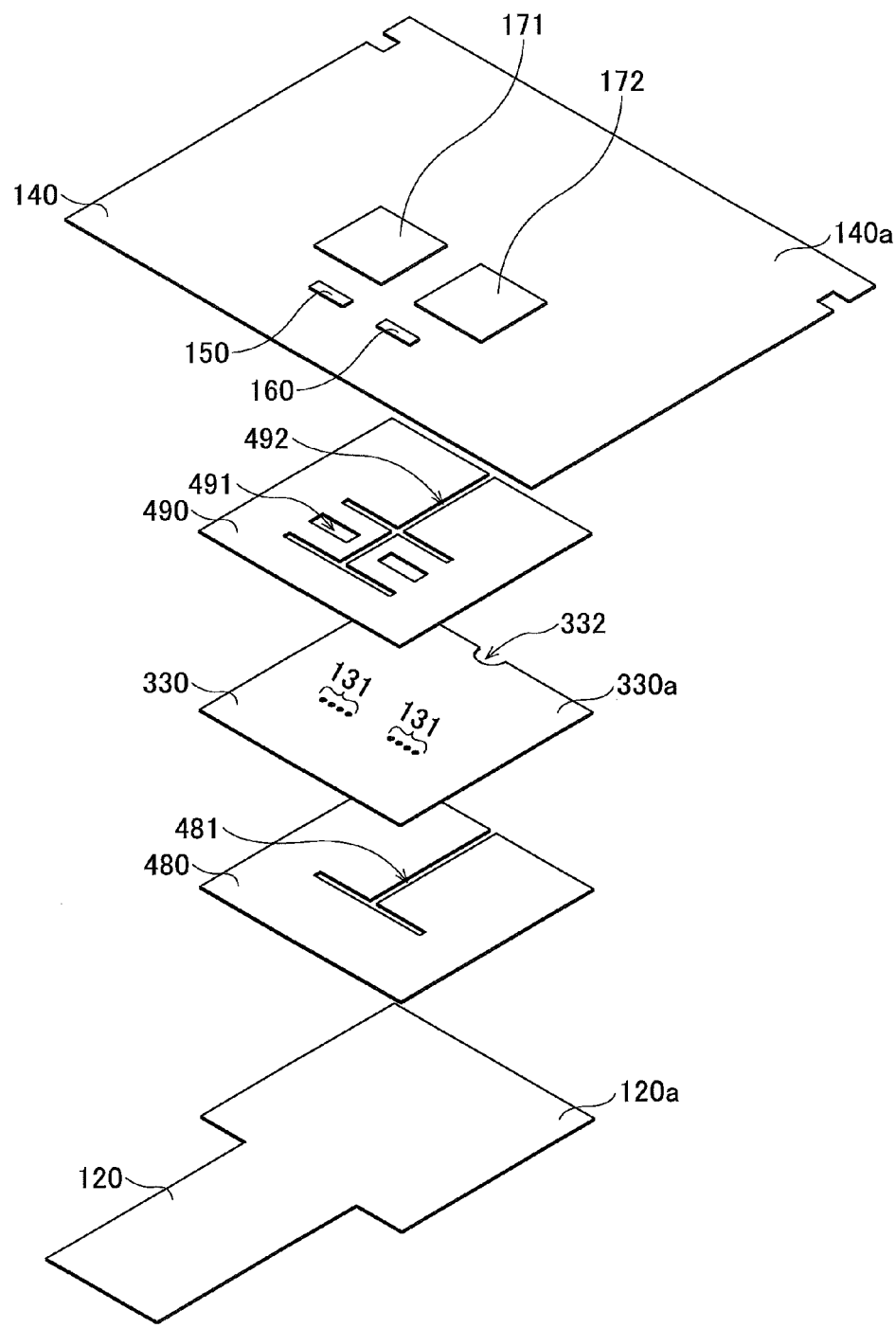
FIG. 25 is an exploded perspective view of the optical waveguide module of the fourth embodiment.
Figure 27A:
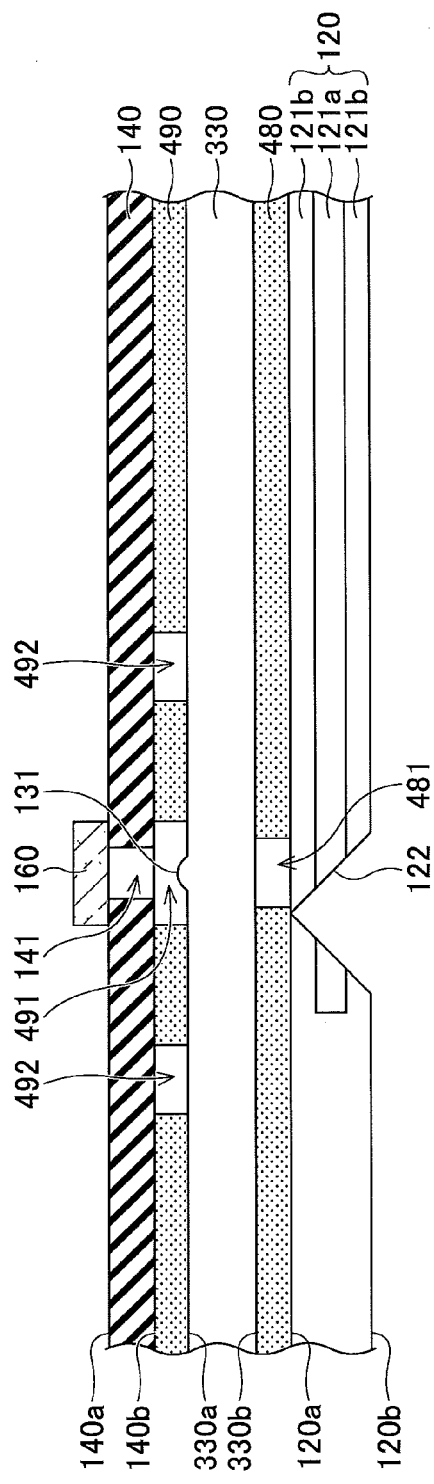
FIG. 27A and FIG. 27B are cross-sectional views of the optical waveguide module of the fourth embodiment.
Figure 27B:
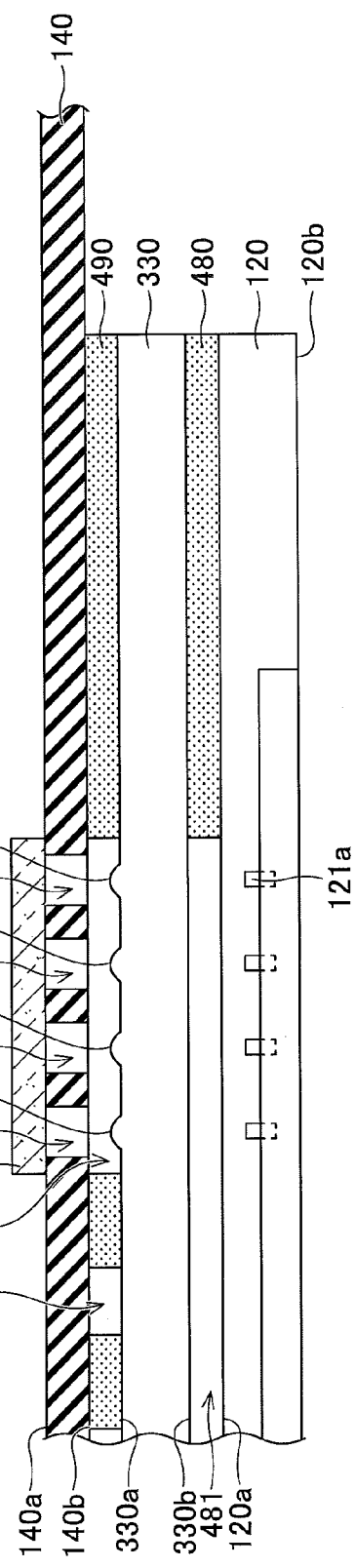

FIG. 24 is a perspective view of the optical waveguide module of the embodiment, and FIG. 25 is an exploded perspective view. FIG. 26A is a cross-sectional view of FIG. 24 taken along a chain line 24A-24B, and FIG. 26B is a cross-sectional view of FIG. 24 taken along a chain line 24C-24D. FIG. 27A is a cross-sectional view of FIG. 24 taken along the chain line 24A-24B under a state that an adhesive agent is not supplied, and FIG. 27B is a cross-sectional view of FIG. 24 taken along the chain line 24C-24D under a state that the adhesive agent is not supplied.

As illustrated in FIG. 24 to FIG. 27B, the optical waveguide module of the embodiment is formed by stacking the lens sheet 330 and the substrate 140 on the optical waveguide 120 in a sheet form.

In the optical waveguide module of the embodiment, the plurality of lenses 131 are formed on the surface 330a of the lens sheet 330. The optical waveguide 120 and the lens sheet 330 are adhered by an adhesion sheet 480. According to the embodiment, the adhesion sheet 480 is provided with a groove 481, which functions as an adhesive agent introducing area. The groove 481 is formed to have a substantially T-shape including a first portion formed at an area corresponding to the mirror 122 of the optical waveguide 120, and the lenses 131 of the lens sheet 330, and a second portion. One end of the second portion is extending from a substantially middle portion of the first portion in a direction perpendicular to the first portion. Another end of the second portion is formed to be an open portion at an outer edge of the adhesion sheet 480. The optical waveguide 120 and the lens sheet 330 are fixed by the adhesive agent 201 introduced in the groove 481. Further, the lens sheet 330 is provided with the notch portion 332 for supplying the adhesive agent 201 in the groove 481.

The substrate 140 is provided with the through-holes 141 at optical paths of light emitted from the light emitting portions of the light emitting element 150, and light injected into the light receiving portions of the light receiving element 160. The lens sheet 330 and the substrate 140 are adhered by an adhesion sheet 490. According to the embodiment, each of the adhesion sheets 480 and 490 are formed in a size substantially the same as that of the lens sheet 330.

The adhesion sheet 490 is provided with open portions 491 at areas where the lenses 131 of the lens sheet 330 are formed. The adhesion sheet 490 is further provided with a groove 492, which functions as an adhesive agent introducing area. The groove 492 is formed to be positioned around each of the open portions 491, respectively, and is formed to have an open portion at an outer edge of the adhesion sheet 490. Specifically, for the illustrated example, the groove 492 includes two line portions extending both sides of the aligned open portions 491, and a portion extending in a direction perpendicular to the two line portions between the two open portions 491 and provided with the open portion. In this embodiment, the notch portion 332 of the lens sheet 330 is formed at a position above the other end of the second portion of the groove 481 when the lens sheet 130 is adhered to the optical waveguide 120 by the adhesion sheet 480. Furthermore, the notch portion 332 of the lens sheet 330 is formed at a position below the open portion of the groove 492 of the adhesion sheet 490 when the adhesion sheet 490 is adhered on the lens sheet 330.

According to the embodiment, after the lens sheet 330 and the substrate 140 are adhered by the adhesion sheet 490, by supplying the adhesive agent 202 between the lens sheet 330 and the substrate 140 from the notch portion 332 provided in the lens sheet 330, the adhesive agent 202 spreads in the groove 492 provided in the adhesion sheet 490 by capillarity. Thereafter, by curing the adhesive agent 202, the lens sheet 330 and the substrate 140 are furthermore adhered and fixed. Each of the adhesion sheets 480 and 490 is a transparent double sided tape or the like, for example.

In the optical waveguide module of the embodiment, the optical waveguide 120, the lens sheet 330 and the substrate 140 are adhered by the adhesion sheets 480 and 490, and furthermore fixed by the adhesive agents 201 and 202, respectively.

According to the optical waveguide module of the embodiment, the lens sheet 330 and the optical waveguide 120 are adhered and fixed by the adhesive agent 201, and the substrate 140 and the lens sheet 330 are adhered and fixed by the adhesive agent 202. Thus, the lens sheet 330 does not move with respect to the optical waveguide 120 to cause positional displacement, and further, the substrate 140 does not move with respect to the lens sheet 330 to cause positional displacement.

(Manufacturing Method of Optical Waveguide Module)

Next, a method of manufacturing the optical waveguide module of the embodiment is described with reference to FIG. 28A to FIG. 30.

Figure 28A:
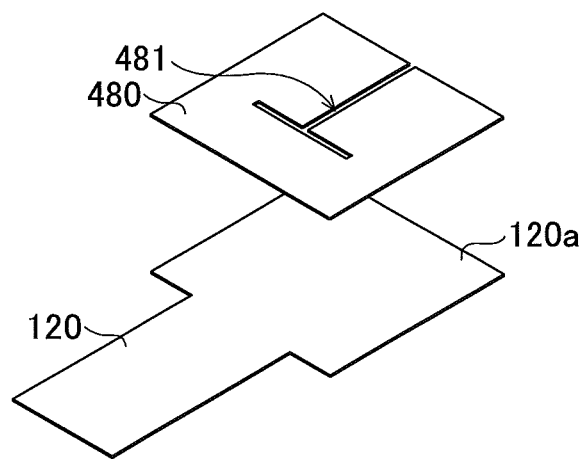
FIG. 28A to FIG. 28C are views illustrating steps of a method of manufacturing the optical waveguide module of the fourth embodiment.

First, as illustrated in FIG. 28A, the adhesion sheet 480 is adhered to the optical waveguide 120. At this time, the adhesion sheet 480 and the optical waveguide 120 are aligned such that the position of the mirror 122 provided in the optical waveguide 120 and the position of the groove 481 formed in the adhesion sheet 480 are matched. The width of the groove 481 formed in the adhesion sheet 480 may be, for example, about 100 μm.

Figure 28B:
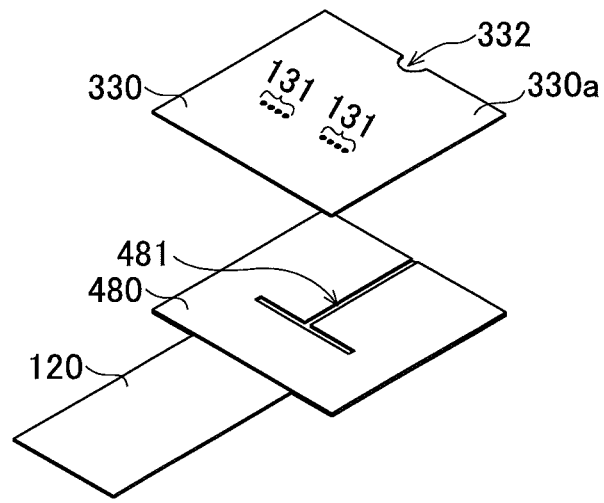

Next, as illustrated in FIG. 28B, the lens sheet 330 is adhered to the adhesion sheet 480. At this time, the lens sheet 330 and the adhesion sheet 480 are aligned such that the position of the mirror 122 and the position of the lenses 131 of the lens sheet 330 are matched. With this, the position of the groove 481 formed in the adhesion sheet 480 and the position of the lenses 131 are matched. Further, the notch portion 332 of the lens sheet 330 is positioned above the open portion of the groove 481 at the outer edge of the adhesion sheet 480.

Figure 28C:
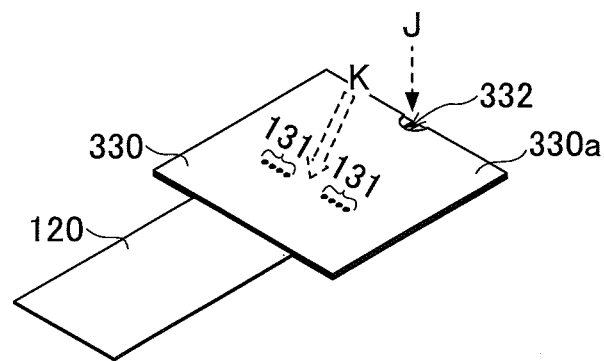

Next, as illustrated in FIG. 28C, as illustrated by a broken line arrow J, the adhesive agent 201 made of UV curing resin is supplied from the notch portion 332.
The adhesive agent 201 supplied from the notch portion 332 spreads in the groove 481 by capillarity to fill the groove 481. Thereafter, as illustrated by a broken line arrow K, UV is irradiated to cure the adhesive agent filled in the groove 481. As such, the optical waveguide 120 and the lens sheet 330 are furthermore adhered and fixed by the cured adhesive agent 201.

Figure 29A:
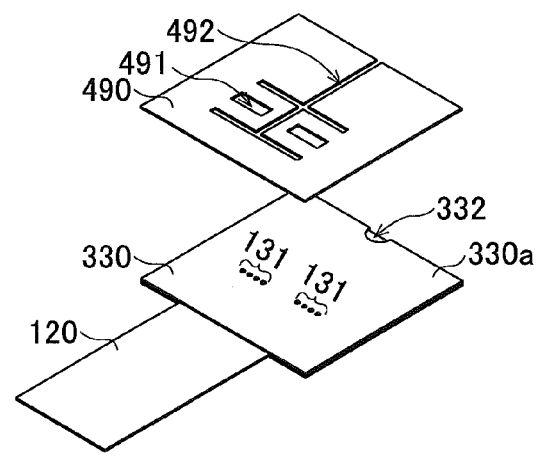
FIG. 29A to FIG. 29C are views illustrating steps of the method of manufacturing the optical waveguide module of the fourth embodiment.
Figure 29B:
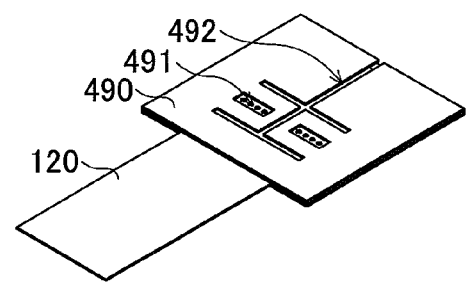

Next, as illustrated in FIG. 29A, after aligning the lens sheet 330 and the adhesion sheet 490 such that the position of the lenses 131 and the position of the open portions 491 formed in the adhesion sheet 490 are matched, the adhesion sheet 490 is adhered to the lens sheet 330. FIG. 29B illustrates a state in which the adhesion sheet 490 is adhered as such.

Figure 29C:
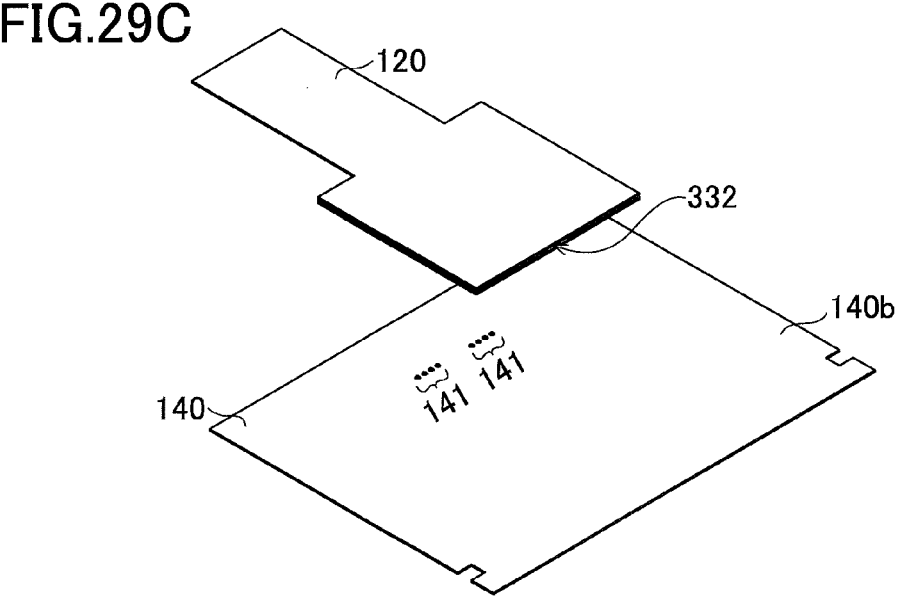

Next, as illustrated in FIG. 29C, the substrate 140 is adhered to the adhesion sheet 490. At this time, the substrate 140 and the adhesion sheet 490 are aligned such that the position of the through-holes 141 of the substrate 140 and the position of the lenses 131 are matched. FIG. 29C illustrates a state in which the structure of FIG. 29B, in which the adhesion sheet 490 is adhered, is reversed and to be adhered to the substrate 140.

Figure 30:
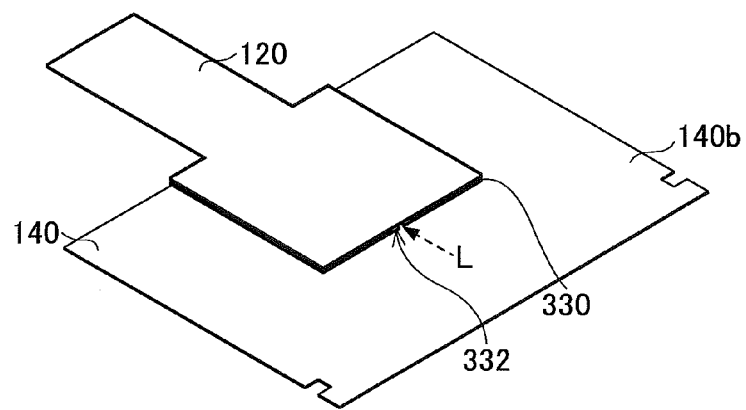
FIG. 30 is a view illustrating a step of the method of manufacturing the optical waveguide module of the fourth embodiment.

Next, as illustrated in FIG. 30, as illustrated by a broken line arrow L, the adhesive agent 202 made of thermosetting resin is supplied from the notch portion 332. The adhesive agent 202 supplied from the notch portion 332 spreads in the groove 492 by capillarity to fill the groove 492. Thereafter, by applying heat, the adhesive agent 202 filled in the groove 492 is cured. As such, the lens sheet 330 and the substrate 140 are furthermore adhered and fixed by the cured adhesive agent 202.

As described above, according to the optical waveguide module of the embodiment, after adhering the optical waveguide 120 and the lens sheet 330 by the adhesion sheet 480, the optical waveguide 120 and the lens sheet 330 are furthermore adhered by the adhesive agent 201 supplied in the groove 481. Thus, the distance between the optical waveguide 120 and the lens sheet 330 is kept at a thickness of the adhesion sheet 480, and the distance does not change. Further, after the lens sheet 330 and the substrate 140 are adhered by the adhesion sheet 490, the lens sheet 330 and the substrate 140 are furthermore adhered by the adhesive agent 202 supplied in the groove 492 provided in the adhesion sheet 490. Thus, the distance between the lens sheet 330 and the substrate 140 is kept at the thickness of the adhesion sheet 490, and the distance does not change. Thus, optical loss does not occur even when adhering by the adhesive agents.

Further, the optical waveguide 120 and the lens sheet 330 are adhered by the adhesive agent 201, and further, the lens sheet 330 and the substrate 140 are adhered by the adhesive agent 202. Thus, even if force is applied to the optical waveguide 120 or the like, the lens sheet 330 does not move with respect to the optical waveguide 120 to cause positional displacement, and further, the substrate 140 does not move with respect to the lens sheet 330 to cause positional displacement.

Structures other than described above are the same as those of the first embodiment.

Fifth Embodiment (Optical Waveguide Module)

Next, an optical waveguide module of a fifth embodiment is described with reference to FIG. 31 to FIG. 34B.

Figure 31:
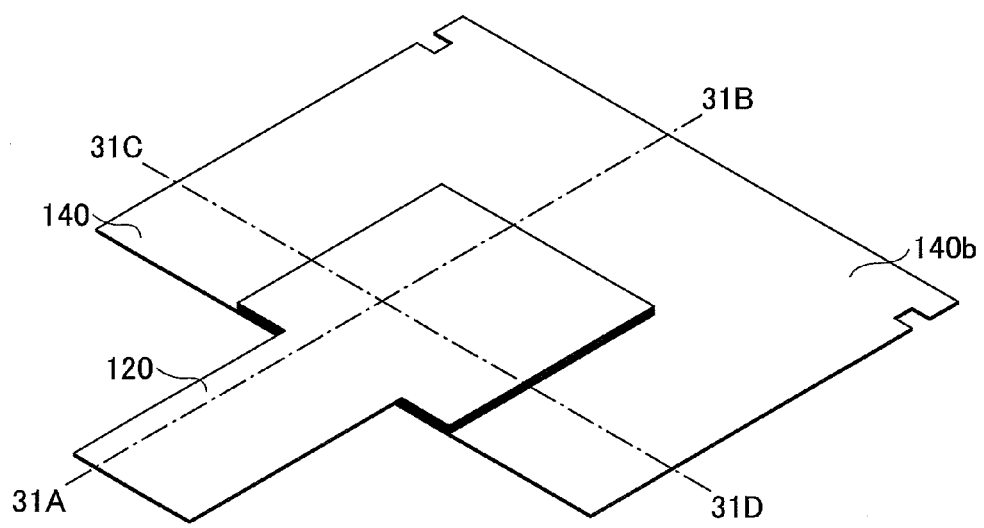
FIG. 31 is a perspective view of an optical waveguide module of a fifth embodiment.
Figure 32:
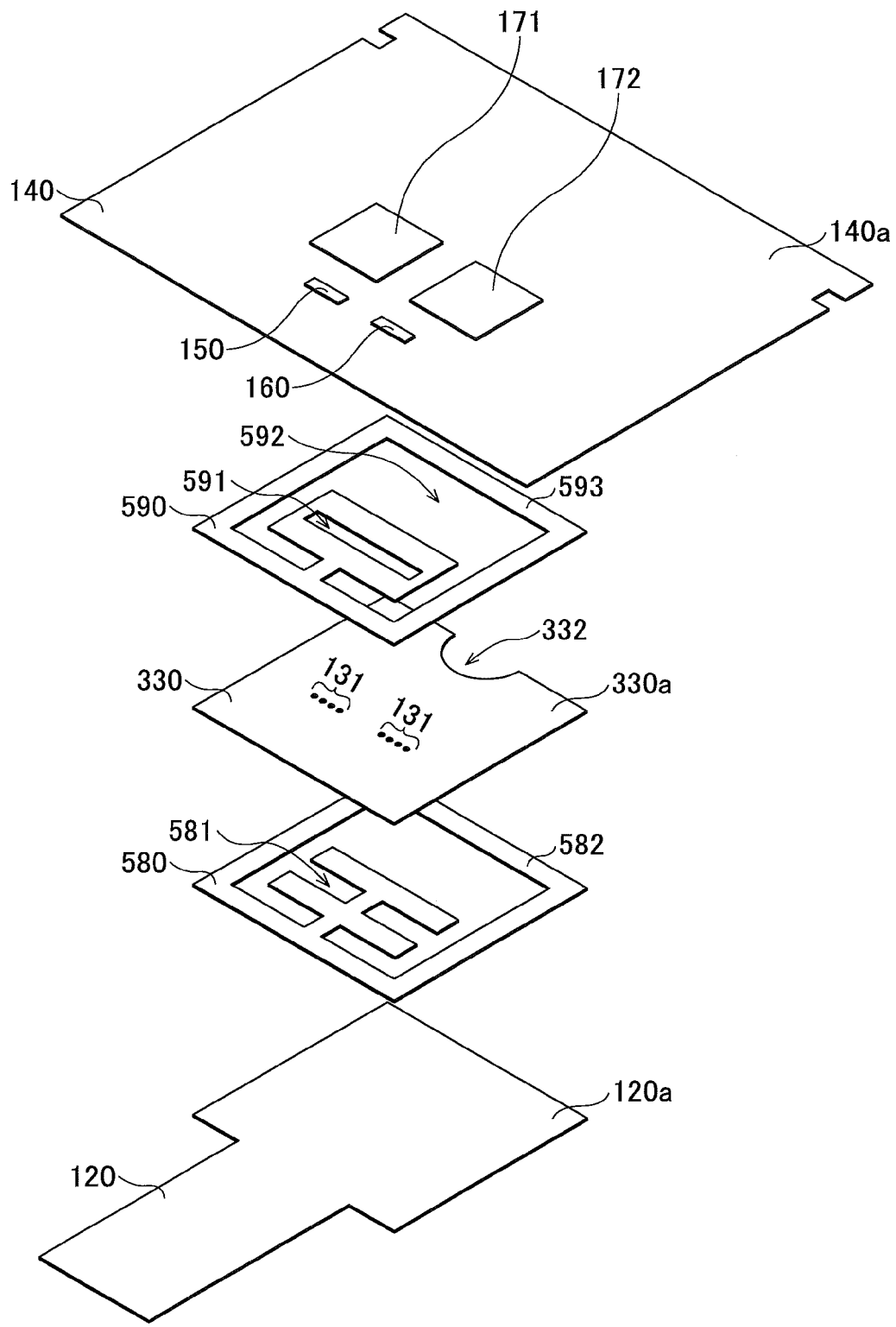
FIG. 32 is an exploded perspective view of the optical waveguide module of the fifth embodiment.
Figure 33A:
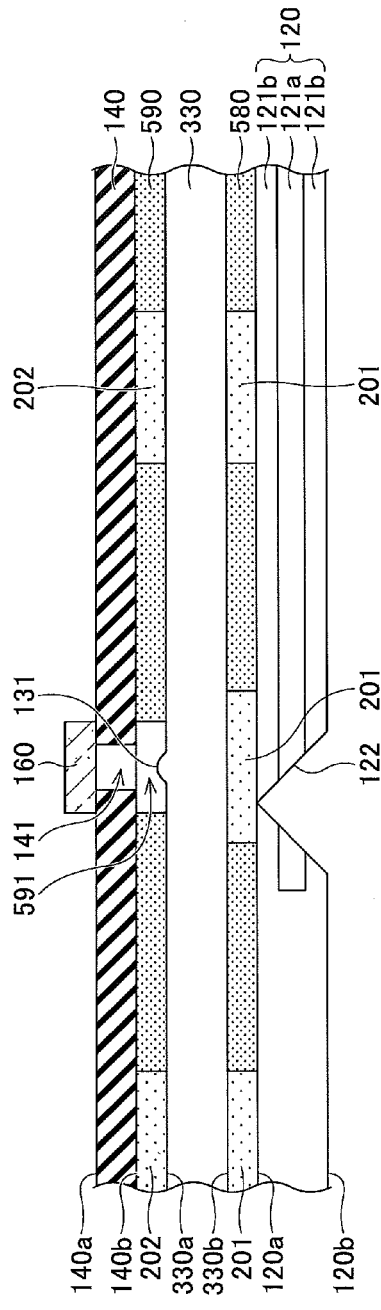
FIG. 33A and FIG. 33B are cross-sectional views of the optical waveguide module of the fifth embodiment.
Figure 33B:
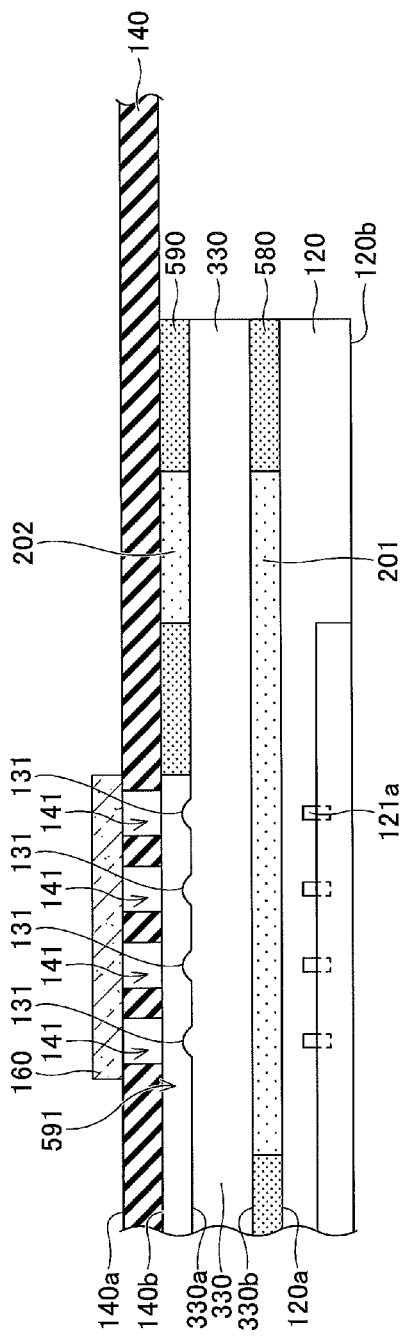
Figure 34A:
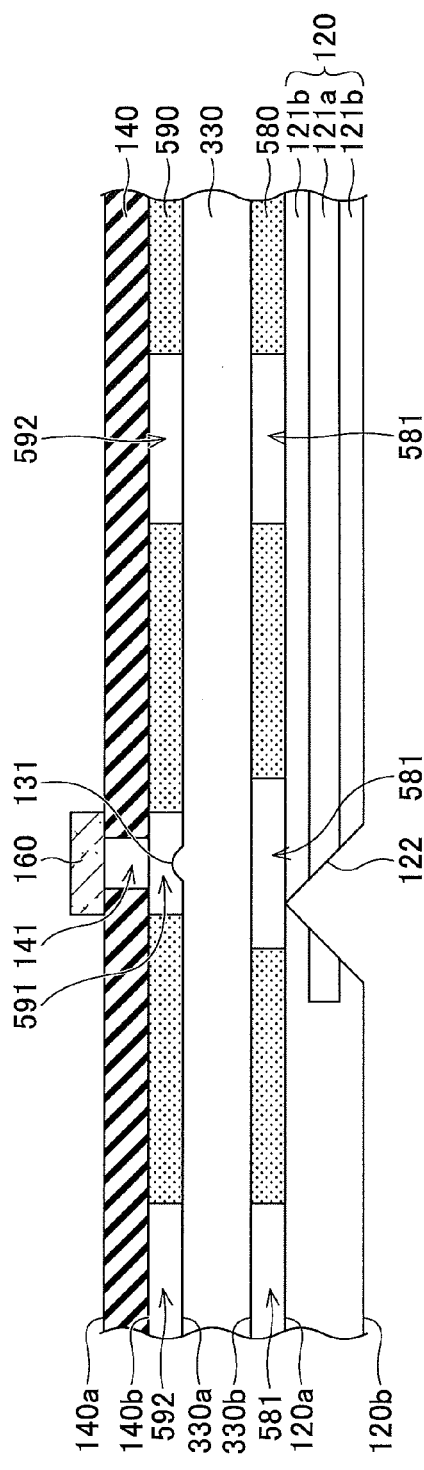
FIG. 34A and FIG. 34B are cross-sectional views of the optical waveguide module of the fifth embodiment.
Figure 34B:
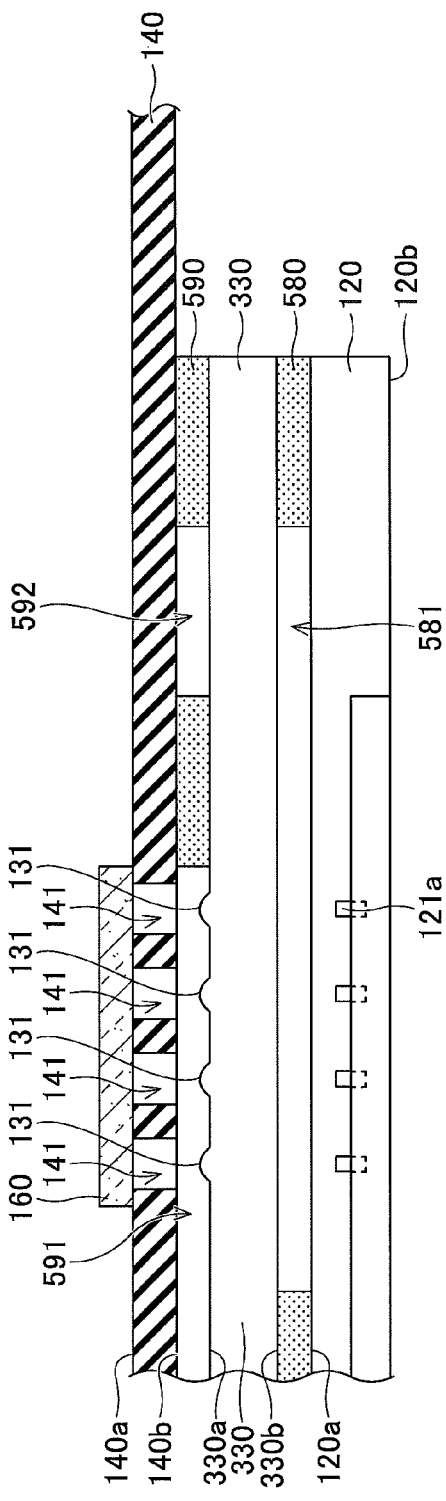

FIG. 31 is a perspective view of the optical waveguide module of the embodiment, and FIG. 32 is an exploded perspective view. FIG. 33A is a cross-sectional view of FIG. 31 taken along a chain line 31A-31B, and FIG. 33B is a cross-sectional view of FIG. 31 taken along a chain line 31C-31D. FIG. 34A and FIG. 34B are cross-sectional views of the optical waveguide module under a state at which an adhesive agent is not supplied. FIG. 34A is a cross-sectional view of FIG. 31 taken along the chain line 31A-31B, and FIG. 34B is a cross-sectional view of FIG. 31 taken along the chain line 31C-31D.

As illustrated in FIG. 31 to FIG. 34B, the optical waveguide module of the embodiment is formed by stacking the lens sheet 330 and the substrate 140 on the optical waveguide 120 in a sheet form.

The optical waveguide 120 and the lens sheet 330 are adhered by an adhesion sheet 580. The adhesion sheet 580 is provided with an adhesive agent introducing area 581 that is open at a position corresponding to the mirror 122 of the optical waveguide 120 and the lenses 131 of the lens sheet 330. The lens sheet 330 is provided with a notch portion 332 for supplying the adhesive agent 201 in the adhesive agent introducing area 581. The optical waveguide 120 and the lens sheet 330 are furthermore adhered by the adhesive agent 201 supplied in the adhesive agent introducing area 581. The adhesion sheet 580 is provided with a frame portion 582 for preventing the adhesive agent 201 from flowing out from the adhesive agent introducing area 581 when the optical waveguide 120 and the lens sheet 330 are adhered by the adhesive agent 201.

The lens sheet 330 and the substrate 140 are adhered by an adhesion sheet 590. According to the embodiment, each of the adhesion sheets 580 and 590 is, for example, a transparent double sided tape. Each of the adhesion sheets 580 and 590 is formed in a size substantially the same as that of the lens sheet 330.

The adhesion sheet 590 is provided with an opening 591 at a position corresponding to the lenses 131 of the lens sheet 330 to surround the lenses 131. The adhesion sheet 590 is further provided with an adhesive agent introducing area 592 in which the adhesive agent 202 is introduced. Further, the adhesion sheet 590 is provided with a frame portion 593 for preventing the adhesive agent 202 from flowing out from the adhesive agent introducing area 592 when the lens sheet 330 and the substrate 140 are adhered by the adhesive agent 202.

In this embodiment, after the lens sheet 330 and the substrate 140 are adhered by the adhesion sheet 590, the adhesive agent 202 is supplied from the notch portion 332 into the adhesive agent introducing area 592. The adhesive agent 202 spreads by capillarity in the adhesive agent introducing area 592 to fill the adhesive agent introducing area 592. Thereafter, by curing the adhesive agent 202 in the adhesive agent introducing area 592, the lens sheet 330 and the substrate 140 are adhered.

According to the optical waveguide module of the embodiment, as the lens sheet 330 and the optical waveguide 120 are adhered and fixed by the adhesive agent 201, the lens sheet 330 does not move with respect to the optical waveguide 120 to cause positional displacement. Similarly, as the substrate 140 and the lens sheet 330 are adhered and fixed by the adhesive agent 202, the substrate 140 does not move with respect to the lens sheet 330 to cause positional displacement.

Meanwhile, as the lens sheet 330 and the optical waveguide 120 are adhered by the adhesion sheet 580, a distance between the lens sheet 330 and the optical waveguide 120 in a thickness direction can be easily controlled. Similarly, as the lens sheet 330 and the substrate 140 are adhered by the adhesion sheet 590, a distance between the lens sheet 330 and the substrate 140 in a thickness direction can be easily controlled.

(Manufacturing Method of Optical Waveguide Module)

Next, a method of manufacturing the optical waveguide module of the embodiment is described with reference to FIG. 35A to FIG. 37.

Figure 35A:
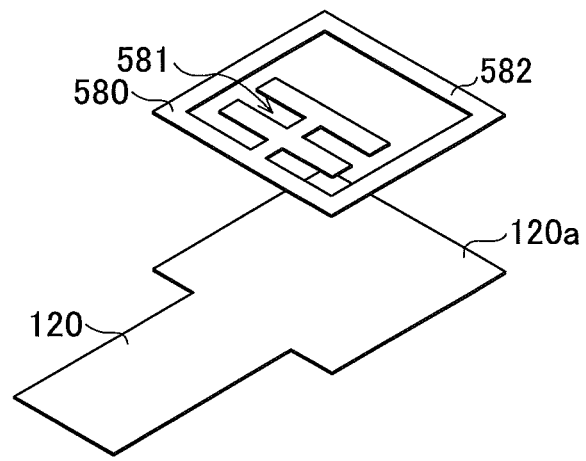
FIG. 35A to FIG. 35C are views illustrating steps of a method of manufacturing the optical waveguide module of the fifth embodiment.

First, as illustrated in FIG. 35A, the adhesion sheet 580 is adhered to the optical waveguide 120. At this time, the adhesion sheet 580 and the optical waveguide 120 are aligned such that the mirror 122 and the adhesive agent introducing area 581 formed in the adhesion sheet 580 are matched.

Figure 35B:
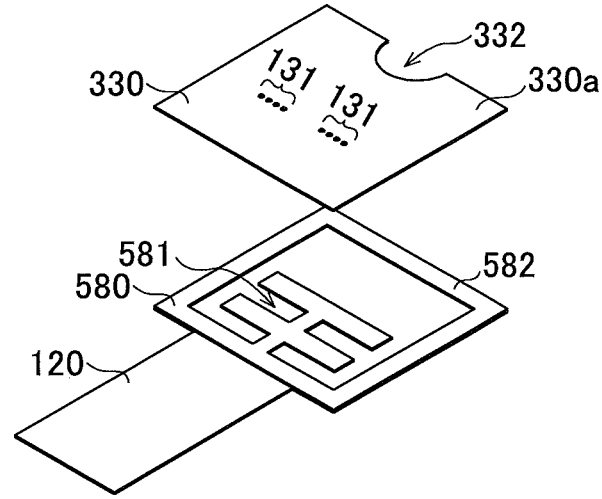

Next, as illustrated in FIG. 35B, the lens sheet 330 is adhered to the adhesion sheet 580. At this time, the lens sheet 330 and the adhesion sheet 580 are aligned such that the position of the mirror 122 and the position of the lenses 131 are matched. With this, the position of the adhesive agent introducing area 581 and the position of the lenses 131 are matched and the notch portion 332 of the lens sheet 330 is positioned above the adhesive agent introducing area 581.

Figure 35C:
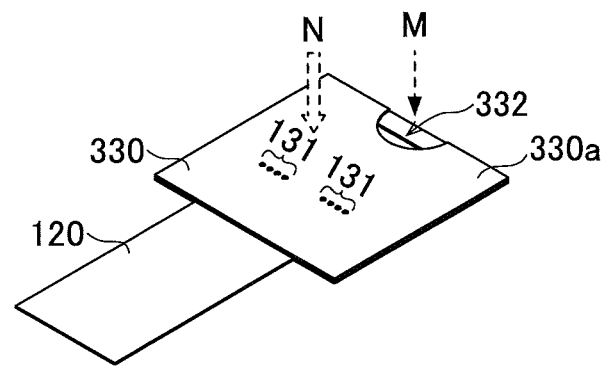

Next, as illustrated in FIG. 35C, as illustrated by a broken line arrow M, UV curing resin is supplied to the notch portion 332 of the lens sheet 330 as the adhesive agent 201. The adhesive agent 201 supplied from the notch portion 332 spreads in the adhesive agent introducing area 581 by capillarity to fill the adhesive agent introducing area 581. Thereafter, as illustrated by a broken line arrow N, UV is irradiated from the surface 330a of the lens sheet 330 to cure the adhesive agent 201 in the adhesive agent introducing area 581. With this, the optical waveguide 120 and the lens sheet 330 are furthermore adhered.

Figure 36A:
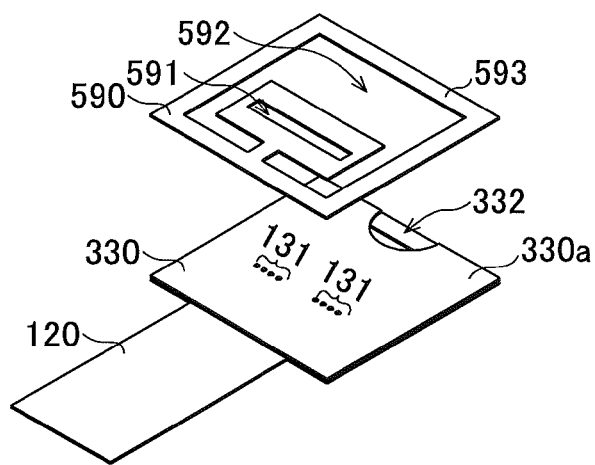
FIG. 36A to FIG. 36C are views illustrating steps of the method of manufacturing the optical waveguide module of the fifth embodiment.
Figure 36B:
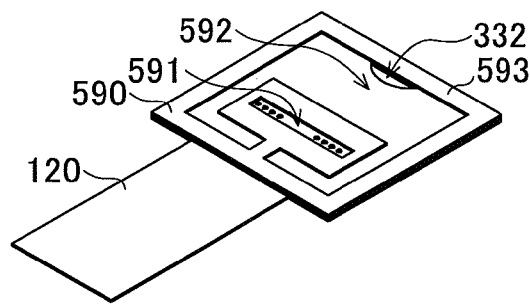

Next, as illustrated in FIG. 36A, after aligning such that the position of the lenses 131 and the position of the opening 591 are matched, the adhesion sheet 590 is adhered to the lens sheet 330. FIG. 36B illustrates a state in which the adhesion sheet 590 is adhered.

Figure 36C:
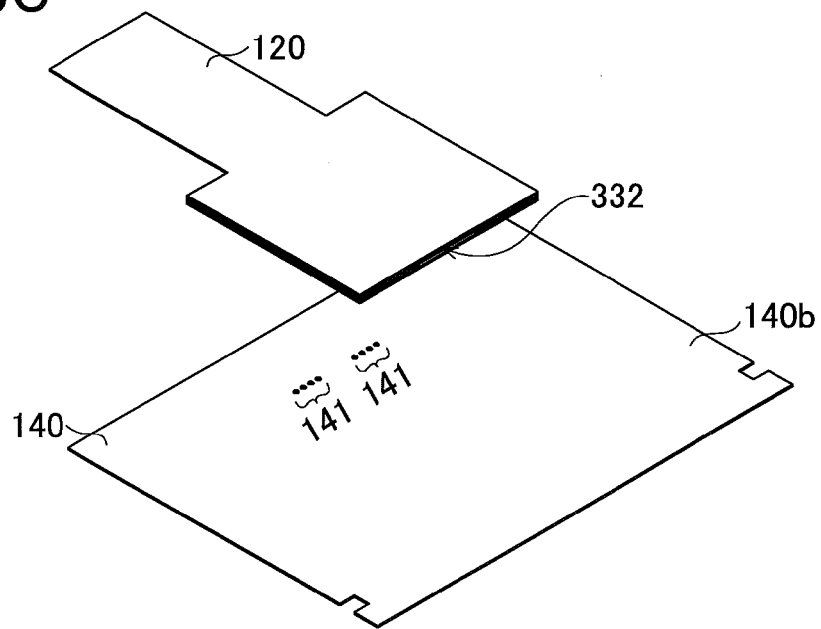

Next, as illustrated in FIG. 36C, the substrate 140 is adhered to another surface of the adhesion sheet 590. At this time, the substrate 140 and the adhesion sheet 590 are aligned such that the position of the through-holes 141 and the position of the lenses 131 are matched.

Figure 37:
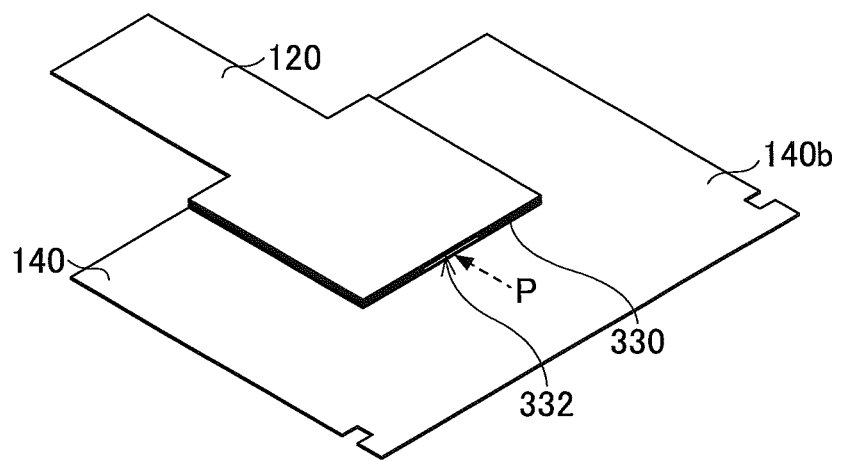
FIG. 37 is a view illustrating a step of the method of manufacturing the optical waveguide module of the fifth embodiment.

Next, as illustrated in FIG. 37, as illustrated by a broken line arrow P, the adhesive agent 202 made of thermosetting resin is supplied in the notch portion 332 from a side surface of the adhesion sheet 590 that is sandwiched by the lens sheet 330 and the substrate 140. The adhesive agent supplied from the notch portion 332 spreads in the adhesive agent introducing area 592 by capillarity to fill the adhesive agent introducing area 592. Thereafter, by applying heat, the adhesive agent 202 filled in the adhesive agent introducing area 592 is cured, and the lens sheet 330 and the substrate 140 are adhered.

As described above, according to the optical waveguide module of the embodiment, after adhering the optical waveguide 120 and the lens sheet 330 by the adhesion sheet 580, the optical waveguide 120 and the lens sheet 330 are furthermore adhered by supplying the adhesive agent 201 in the adhesive agent introducing area 581. Thus, the distance between the optical waveguide 120 and the lens sheet 330 is kept at a thickness of the adhesion sheet 580, and the distance does not change. Further, after adhering the lens sheet 330 and the substrate 140 by the adhesion sheet 590, the lens sheet 330 and the substrate 140 are furthermore adhered by supplying the adhesive agent 202 in the adhesive agent introducing area 592. Thus, the distance between the lens sheet 330 and the substrate 140 is kept at a thickness of the adhesion sheet 590, and the distance does not change. Thus, optical loss does not occur even when adhering by the adhesive agents.

Further, the optical waveguide 120 and the lens sheet 330 are adhered by the adhesive agent 201, and further, the adhesive agent 201 is introduced in the adhesive agent introducing area 581 surrounded by the frame portion 582 of the adhesion sheet 580 sandwiched by the optical waveguide 120 and the lens sheet 330 to adhere the parts. Similarly, the lens sheet 330 and the substrate 140 are adhered by the adhesive agent 202, and further, the adhesive agent 202 is introduced in the adhesive agent introducing area 592 surrounded by the frame portion 593 of the adhesion sheet 590 sandwiched by the lens sheet 330 and the substrate 140 to adhere the parts. Thus, even if force is applied to the optical waveguide 120 or the like, the lens sheet 330 does not move with respect to the optical waveguide 120, and further, the substrate 140 does not move with respect to the lens sheet 330 to cause positional displacement.

Structures other than described above are the same as those of the first embodiment.

According to the optical waveguide module of the embodiment, positional displacement of the light emitting element, the light receiving element and the like with respect to the optical waveguide while being used can be prevented.

Although a preferred embodiment of the optical module and the method of manufacturing the optical module has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

The above described adhesion sheet 180, 380, 480 or 580 is an example of a first adhesion film, and the adhesion sheet 190, 390, 490 or 590 is an example of a second adhesion film.

What is claimed is:

1. An optical module comprising:
   an optical waveguide;
   a lens sheet including a lens;
   a substrate on one surface of which at least one of a light emitting element and a light receiving element is mounted;
   a first adhesion film that adheres the optical waveguide to the lens sheet; and
   a second adhesion film that adheres the lens sheet to the substrate, the second adhesion film being provided with an opening at an area where the lens is formed, the second adhesion film further being provided with an adhesive agent introducing area to which an adhesive agent is supplied, the adhesive agent introducing area being different from the opening where the lens is formed, wherein the lens sheet and the substrate are adhered by an adhesive agent supplied to the adhesive agent introducing area.

2. The optical module according to claim 1, wherein the first adhesion film is provided with another adhesive agent introducing area to which an adhesive agent is supplied, and wherein the optical waveguide and the lens sheet are adhered by an adhesive agent supplied to the other adhesive agent introducing area.

3. The optical module according to claim 2, wherein the optical waveguide includes a mirror, and wherein the other adhesive agent introducing area is provided between the mirror and the lens.

4. An optical module comprising:

an optical waveguide;

a lens sheet including a lens;

a substrate on one surface of which at least one of a light emitting element and a light receiving element is mounted;

a first adhesion film that adheres the optical waveguide to the lens sheet;

a second adhesion film that adheres the lens sheet to the substrate; and an adhesive agent introducing area, provided at at least one of the first adhesion film and the second adhesion film, to which an adhesive agent is supplied, wherein the lens sheet includes a through-hole or a notch portion for supplying the adhesive agent.

5. A method of manufacturing an optical module, comprising:

adhering an optical waveguide to a lens sheet by a first adhesion film so as to form a space between the optical waveguide and the lens sheet;

adhering the lens sheet to a substrate by a second adhesion film, the second adhesion film being provided with an opening at an area where the lens is formed, the second adhesion film further being provided with an adhesive agent introducing area, the adhesive agent introducing area being different from the opening where the lens is formed;

supplying an adhesive agent to the space formed between the lens sheet and the optical waveguide to further adhere the optical waveguide to the lens sheet by the adhesive agent; and supplying an adhesive agent to the adhesive agent introducing area to further adhere the lens sheet to the substrate.

6. The method of manufacturing the optical module according to claim 5, wherein in the supplying the adhesive agent to the adhesive agent introducing area, the adhesive agent is supplied around the second adhesion film.

7. The method of manufacturing the optical module according to claim 5, wherein in the adhering the lens sheet to the substrate by the second adhesion film, a space is formed between the lens sheet and the substrate, wherein in the supplying the adhesive agent to the adhesive agent introducing area, the adhesive agent is supplied to the space formed between the lens sheet and the substrate.

* * * * *